United States Patent [19]

Duggan et al.

[11] Patent Number: 5,584,035
[45] Date of Patent: Dec. 10, 1996

[54] OBJECT BASED SYSTEM COMPRISING USER INTERFACE PERMITTING MANIPULATION OF OBJECTS BY USERS

[75] Inventors: Hugh Duggan, Horfield, England; William Morel, Redmond, Wash.

[73] Assignee: Hewlett-Packard Company, Palo Alto, Calif.

[21] Appl. No.: 495,038

[22] Filed: Jun. 27, 1995

Related U.S. Application Data

[63] Continuation of Ser. No. 736,044, Jul. 25, 1991, abandoned.

[30] Foreign Application Priority Data

Jul. 31, 1990 [EP] European Pat. Off. ............ 90308449

[51] Int. Cl.[6] .................. G06F 11/30; G06F 3/14
[52] U.S. Cl. ................... 395/800; 395/133; 395/62; 395/326; 364/DIG. 1; 364/242.94; 364/286.3
[58] Field of Search .................. 395/800, 155, 395/159, 650, 157, 158, 62, 133

[56] References Cited

U.S. PATENT DOCUMENTS

| 4,937,036 | 6/1990 | Beard et al. ............... 340/706 |
| 4,974,173 | 11/1990 | Stefik et al. ............. 395/159 |
| 4,982,344 | 1/1991 | Jordan .................. 395/157 |
| 5,008,853 | 4/1991 | Bly et al. ............... 340/717 |
| 5,029,104 | 7/1991 | Dodson et al. ........... 395/650 |
| 5,065,347 | 11/1991 | Pajak et al. ............. 395/159 |
| 5,072,412 | 12/1991 | Henderson, Jr. et al. ... 395/158 |
| 5,117,351 | 5/1992 | Miller .................. 395/650 |
| 5,119,493 | 6/1992 | Janis et al. ............ 395/650 |
| 5,121,478 | 6/1992 | Rao ..................... 395/157 |
| 5,129,084 | 7/1992 | Kelly, Jr. et al. ....... 395/650 |
| 5,140,677 | 8/1992 | Fleming et al. .......... 395/159 |
| 5,185,885 | 2/1993 | Dysart et al. ........... 395/600 |
| 5,237,654 | 8/1993 | Shackelford et al. ...... 395/160 |

OTHER PUBLICATIONS

E. C. Arnold et al, "Object Oriented Software Technologies Applied to Switching System Architectures and Software Development Processes", AT&T Bell Labs, International Switching Symposium 1990 May 28–1990 vol. 2, pp. 97–106.

Microsoft Windows User's Guide, Version 3.0, Microsoft Corp, 1990 pp. 135–137.

The Next Book, Bruce Webster Addison–Wesley Publishing Company Inc, Jul. 1989 pp. 118–264.

*Primary Examiner*—Mehmet B. Geckil

[57] ABSTRACT

A distributed object based system includes primary and secondary objects. Primary objects can sustain containership links to other objects in the same storage domain and weak links can exist between objects in different storage domains.

19 Claims, 25 Drawing Sheets

A TYPICAL TASK WINDOW.

DESKTOP

| CONTAINED BY | — |
|---|---|
| CONTAINS | FOLDER A<br>FOLDER B |
| WEAKLY LINKED TO | — |

FOLDER A

| CONTAINED BY | DESKTOP |
|---|---|
| CONTAINS | DOCUMENT A |
| WEAKLY LINKED TO | — |

FOLDER B

| CONTAINED BY | DESKTOP |
|---|---|
| CONTAINS | DOCUMENT B<br>VDO B |
| WEAKLY LINKED TO | — |

DOCUMENT A

| CONTAINED BY | FOLDER A |
|---|---|
| CONTAINS | — |
| WEAKLY LINKED TO | — |

DOCUMENT B

| CONTAINED BY | FOLDER B |
|---|---|
| CONTAINS | TABLE<br>BAR CHART |
| WEAKLY LINKED TO | — |

VDO B

| CONTAINED BY | FOLDER B |
|---|---|
| CONTAINS | — |
| WEAKLY LINKED TO | TABLE<br>BAR CHART |

TABLE

| CONTAINED BY | DOCUMENT B |
|---|---|
| CONTAINS | — |
| WEAKLY LINKED TO | VDO B |

BAR CHART

| CONTAINED BY | DOCUMENT B |
|---|---|
| CONTAINS | — |
| WEAKLY LINKED TO | VDO B |

FIG 8

| GENERAL OBJECT TYPE | SPECIFIC OBJECT TYPE | OBJECT ID | $F_1$ | $F_2$ | $F_3$ |
|---|---|---|---|---|---|
| SO | FOLDER | # | SET | NOT SET | NOT SET |
| SO | VDO | # | NOT SET | NOT SET | NOT SET |
| WO | TW | # | N/A | N/A | NOT SET |
| SO | DOCUMENT | # | SET | SET | NOT SET |
| | | | | | |
| | | | | | |
| | | | | | |
| | | | | | |

FIG 9a

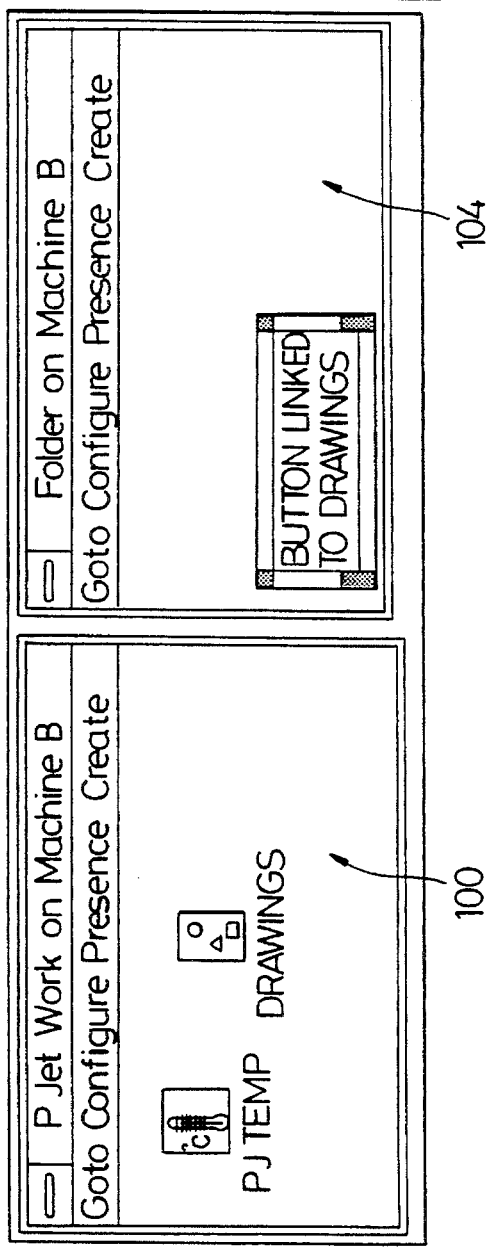
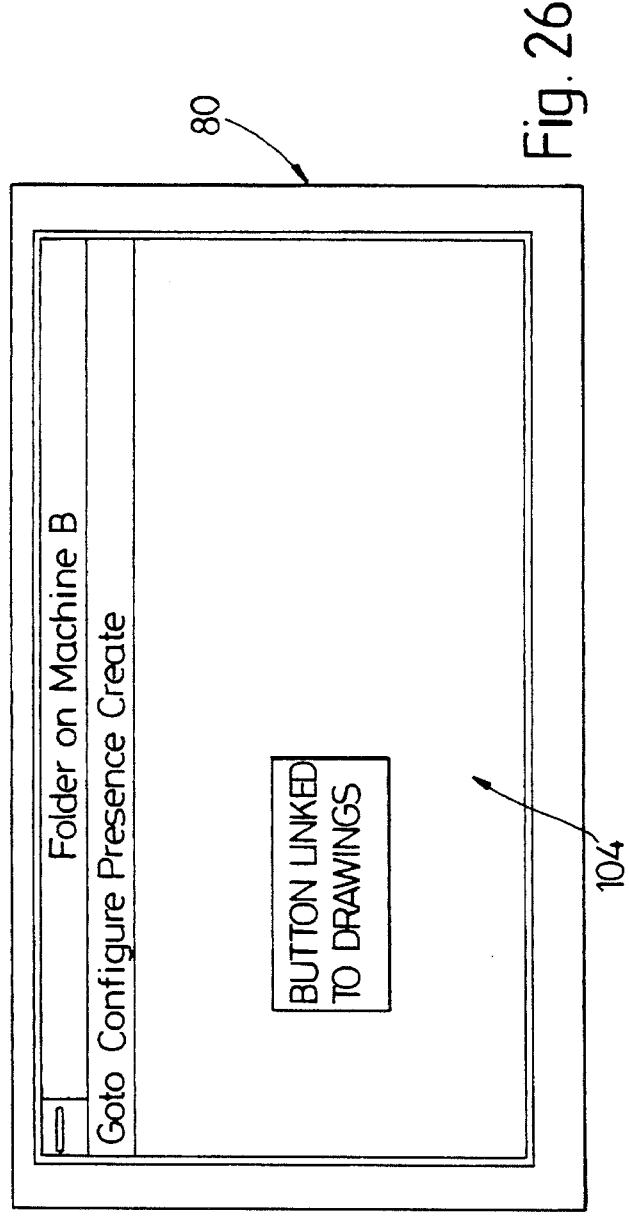
Fig. 25
Fig. 26

OBJECT BASED SYSTEM COMPRISING USER INTERFACE PERMITTING MANIPULATION OF OBJECTS BY USERS

This is a continuation of application Ser. No. 07/736,044, filed Jul. 25, 1991, now abandoned.

FIELD OF INVENTION

The present invention relates to an object based system and relates particularly but not exclusively to a distributed object based system which is accessible using a windows interface.

BACKGROUND OF THE INVENTION

The term "object based system" is used to mean a system comprising several software components or "objects".

A software object has its own data and associated methods. Objects intercommunicate by sending "messages", i.e., data, instructions, requests, etc, to one another, normally via object management software. An object is initially a data file stored on disc. If object management software wishes to pass a message to it, a process will be initiated which reads the data file as part of its initialization. If an object is fully defined by its disc file and has no process associated with it, it is said to be "inactive". If an object has a process associated with it and is defined by the state of that process then it is said to be "active".

Generally, an object can be regarded as a discrete entity, e.g., it can individually be moved, copied, destroyed, etc.

In this context, in the embodiment to be described, an object is something which has a unique identifier and which can be sent a message.

The term "link" can have several different meanings in relation to objects in an object based system and an introduction to some of the possible meanings follows More will be said about "containership links", other interobject links and "window links" in the specific description with reference to the drawings.

When designing an object based system, as an optimization feature it is possible to define a hierarchical classification system of class objects in which class objects lower down the hierarchy (sub-classes) "inherit" characteristics from their superclasses. An example from the field of biology is shown in FIG. 1a.

The Class Object Animals has certain data and methods associated with it which are generic to all Animal Objects. Its sub-classes, Class Object Vertebrates and Class Object Invertebrates inherit the characteristics of their superclass Animals and, in addition, each contains extra data and/or methods specific to their class and so on down the classification tree. Each of the links in FIG. 1a is an "AKO" (a kind of) link, e.g., a Mammal is a kind of vertebrate and a primate is a kind of mammal.

When it is desired to create an instance of a class, e.g., a particular Kangaroo called Hoppy, this can be done by taking a copy of a Kangaroo Class Object and specifying Hoppy's characteristics of interest, e.g., height, weight or whatever. The Hoppy Object has an "ISA" (is a) link to the Kangaroo Class Object.

Such a system reduces the amount of code needing to be written for new objects since objects automatically use generic code of superclasses (AKO Links) and relevant Class Objects (ISA Links).

As well as ISA and AKO links there may be other kinds of object links designed into a system. One known type of link is a containership link (sometimes referred to as a "parentage" or "ownership" link) which largely determines the location of an object and there need to be rules governing what happens to an object when its container is moved, copied, destroyed, etc. It is with such further types of links that the present application is concerned rather than the basic AKO and ISA links mentioned above which may be inherent in the system design.

In the embodiment to be described, these further links are bidirectional, i.e., both of the objects involved have a record of the link.

Yet another type of link is that between an object and a window viewing that object—a "window link".

Furthermore, windows may also be objects and have inter object links with other windows.

In this specification, when there is a risk of confusion between window objects and other objects the latter will be termed "semantic objects". Generally, however, the term "object" means "semantic object".

As used herein, a "semantic object" or a "semantic part" of an object is an object or object part which has stored data and which is, by virtue of the stored data, persistent. A "presentation object" or "presentation part" is utilized to present to a user the data of a semantic object or semantic object part and has no persistence in the system on termination of the user session.

The term "click" will be used in this specification to denote a selection made by the user using an input device, such as a mouse.

A storage domain may be regarded as closely equivalent to a storage medium such as a hard disc or floppy disc in the sense that all objects in a given storage domain are on-line together or are off-line together. Consequently, a single machine may support a plurality of storage domains.

SUMMARY OF THE INVENTION

An object based computer system in accordance with the present invention comprises a plurality of objects, means for activating the said objects, graphics display means for displaying representations of the objects, linking means for sustaining containership links between a first object in a storage domain and other objects in the same storage domain and for sustaining weak links between the said first object and other objects in different storage domains.

In one embodiment of the present invention the objects include primary objects and secondary objects, wherein only primary objects can contain other objects.

In another embodiment of the present invention each object has no more than one container.

In still another embodiment of the invention the system further comprises means for sustaining either a containership link or a weak link between a primary object and a secondary object in the same storage domain as the primary object.

In yet another embodiment of the present invention the system further comprises means for automatically displaying a primary object when a user selects a secondary object that is weakly linked to the primary object.

In yet another embodiment of the present invention the system further comprises means for sustaining a weak link between a secondary object and another secondary object.

In yet another embodiment of the present invention the system further comprises means for storing in a distributed manner the identity of objects to which an object is linked together with an indication of the nature of each link.

A preferred embodiment of the present invention is primarily concerned with the organization of an object based system that has a plurality of user stations. Such a system may be provided by a single central processing device having a plurality of user stations coupled to it, or by a distributed processing network that comprises a number of independent processing units each having a respective station associated with it.

The present invention is also concerned with an object based system having a plurality of storage domains supported on a single station.

In the context of the present invention, a link is a reference to another object which causes messages to be sent to the other object in certain predefined circumstances.

Weak links between objects can be of different types, i.e., they can have different effects, according to the methods of the linked objects and the nature of the data sent over the link.

Advantageously, the provision of containership links between objects in the same storage domain and a second type of inter-object link, i.e., the weak link, between objects in different storage domains enables object manipulation commands such as Move, Copy, etc, to be interpreted unambiguously and obviates the need for garbage collection.

In a preferred embodiment of the present invention, during a Move operation (which is described below) a containership link between two objects does not guarantee that both objects are in the same storage domain. Otherwise an object and its container can be assumed to be in the same storage domain. This feature is useful for performance, reliability, control and back-up purposes.

In the preferred embodiment to be described, there are certain primary objects which cannot contain other objects, e.g., the Visible Data Object (VDO) and the ChessBoard.

Preferably, each object has no more than one container. When an object is destroyed, so are all of the objects which it contains.

In the embodiment described below, a primary object can be linked to a secondary object in the same storage domain by a containership link or a weak link.

The existence of a weak link between a primary object and a secondary object may have the effect that a user selecting the secondary object causes the primary object to which it is weakly linked automatically to be displayed. This feature permits a chain of links to be constructed so as to facilitate the creation of cross-references between work items by a user and the provision of specialized facilities for the user. Examples of each case are provided below.

The system may be configured so that a secondary object can sustain a weak link to another secondary object. This feature permits greater flexibility for a user, as described below.

Preferably, the system comprises means for storing, in a distributed manner, the identity of objects to which an object is linked together with an indication of the nature of each link. This information can also be stored centrally for all objects rather than in association with each individual object.

The present invention also encompasses methods for operating a computer system comprising a plurality of software components, or objects. Methods in accordance with the present invention include the steps of sustaining containership links between a first object in a storage domain and other objects in the same storage domain, and sustaining weak links between the said first object and other objects in different storage domains.

Other features of the present invention are described below in connection with the detailed description of a preferred embodiment.

BRIEF DESCRIPTION OF THE DRAWINGS

FIG. 8 shows link information for the objects of FIG. 7.

FIG. 9a shows the information held by an Object Manager.

FIGS. 13 to 30 are screen representations.

DETAILED DESCRIPTION OF A PREFERRED EMBODIMENT

The embodiment to be described is a distributed object based office system which has a user interface of the graphical, direct manipulation style. The system presents the user with objects on a Desktop and the user can change these objects, rearrange them, create new ones and move objects between containers on his own Desktop and other users' Desktops.

The main components of the system will now be described.

System Components

Figure 1:
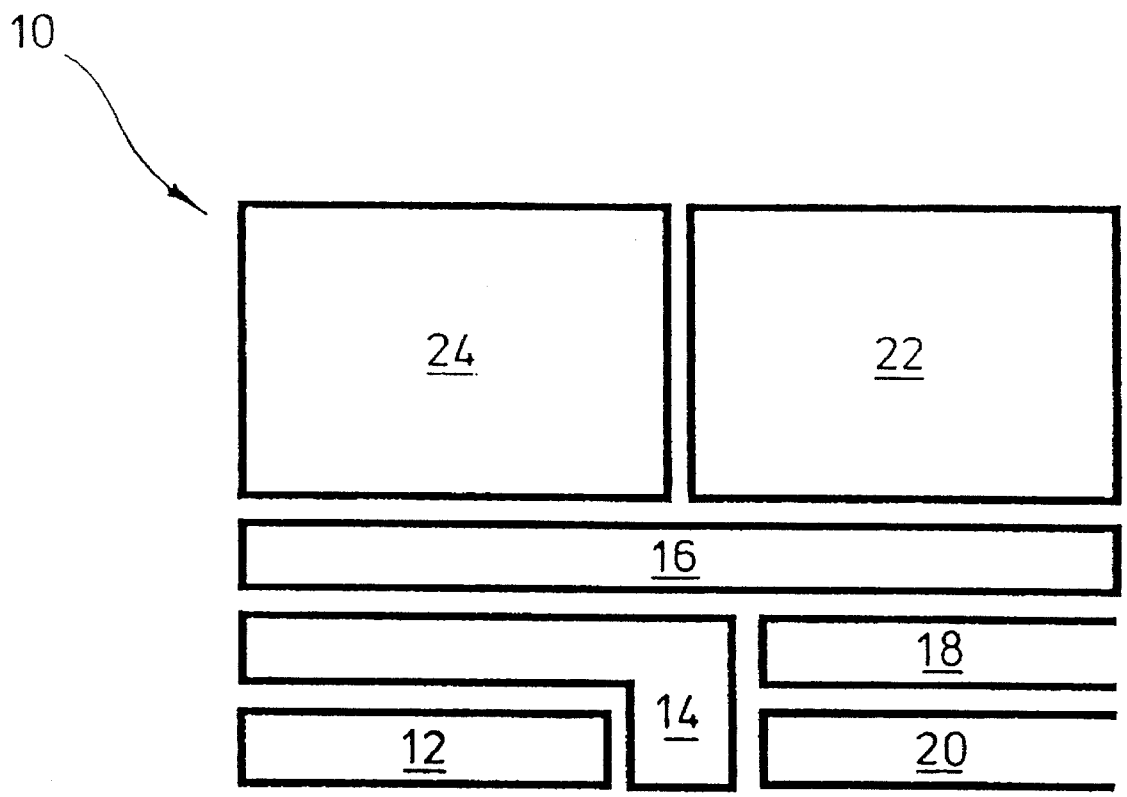
FIG. 1 is a diagram showing the software components of a system in accordance with the present invention.
Figure 1A:
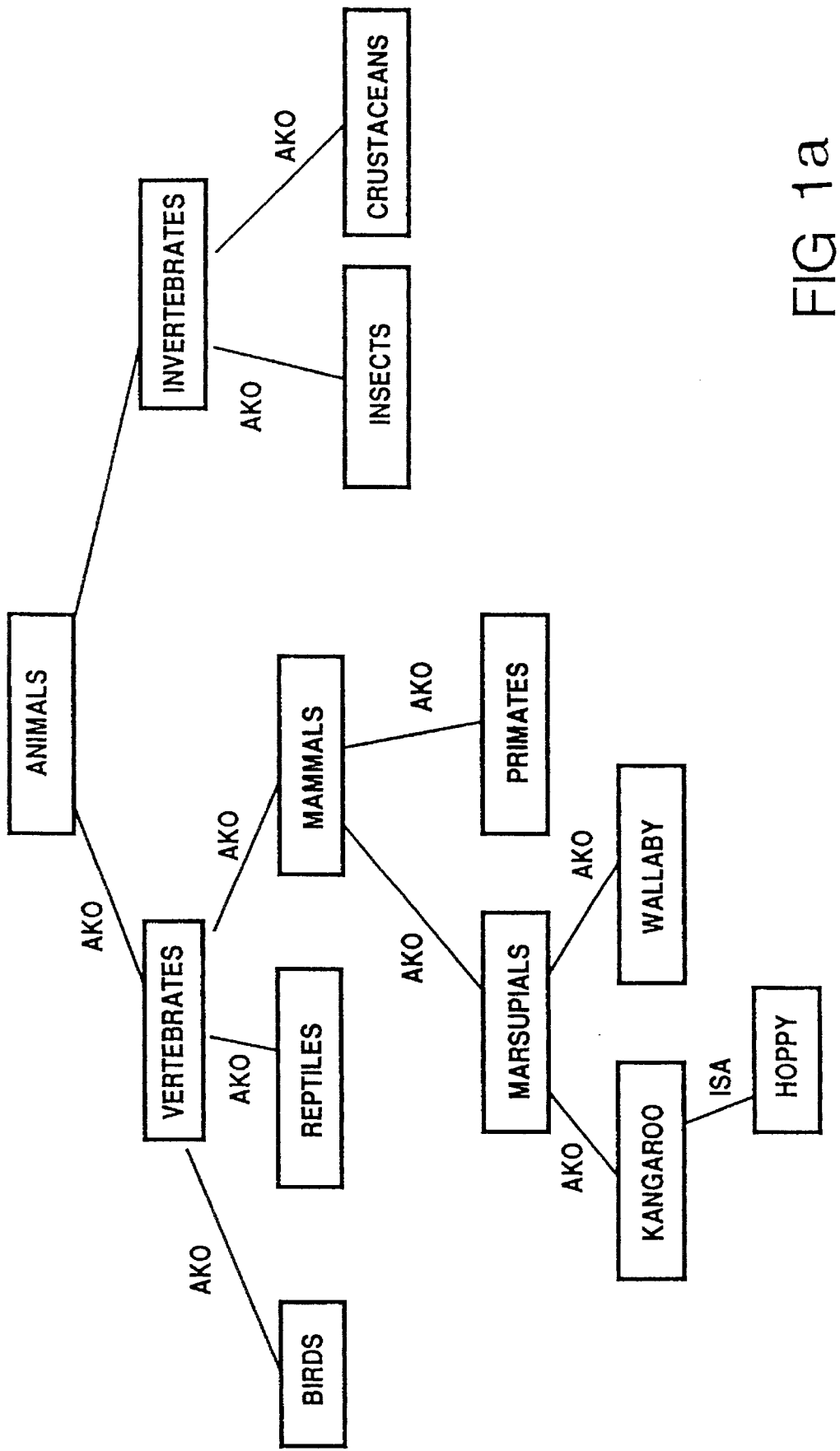
FIG. 1a illustrates an exemplary hierarchical classification system.

Referring to FIG. 1, the software components of a distributed object based system 10 according to the invention are shown. The system 10 may run on networked personal computers each provided with a hard disc, a flexible disc drive and a networking card.

Each PC is loaded with the following software components:

operating system software 12, MSDOS in this example;

windows interface software 14, Microsoft Windows in this example;

object management software (Object Manager (OM)) 16;

distributed message switching software 18;

local area networking software 20;

windows software 22, in this case MS Windows Applications;

semantic objects software 24.

The OM 16 controls the sending and receiving of messages by objects and maintains a catalogue of objects which reside on the machine. In addition, the OM 16 activates an inactive object if a message is received for it and deactivates objects when system memory runs short. The OM 16 also acts as a library to provide primitive utility functions to objects and other processes. In this embodiment, the OM 16 is an MS Windows application, although it has no window and therefore cannot be viewed.

The distributed message switching software (Distributed Message Switch (DMS)) 18 is a terminate and stay resident program and functions as a message router used by the OM 16 to send messages to the correct destinations. The DMS 18 will route messages to a local or remote OM as appropriate.

In this embodiment, the local area networking software 20 comprises two terminate and stay resident programs—one according to IEEE 802.3 standard and the other providing IEEE 802.2 Class I and III services.

The windows software 22 comprises a system window application (System Window) and window applications for displaying window objects (Task Windows). The System Window is a process which controls a user session.

The objects software 24 comprises the semantic objects of the system 10. Each of the objects is a set of data tied to an MS Windows executable file. An object may be active or inactive as defined above. Every object in the entire distributed system has its own unique identifier. Each object identifier has a part indicating in which storage domain the object was created and a part unique within that storage domain. This identifier does not change if the object subsequently moves to a different storage domain. The objects in the system 10 are mobile and may be moved, copied and otherwise manipulated by any user irrespective of where in a physical sense the user and the objects are located. Such manipulation is achieved in a manner which is consistent for all object types. In other words, the network is transparent to a user of the system.

An object, or part of an object, may be viewed by a plurality of Task Windows (belonging to one or more users) at the same time, and will have the same appearance in each Task Window.

In this embodiment there are two types of semantic object—primary objects and secondary objects. All objects, except the Desktop, have a container.

Generally, primary objects can contain other semantic objects and can be viewed by Task Windows in isolation from their containers. However, there are some primary objects which cannot contain other objects, e.g., the Chess-Board and the Visible Data Object (VDO). Certain primary objects can also contain primitive information, i.e., data, e.g., text, image, etc.

Primary objects have an icon which consists of a small picture representing the primary object and a title. The icon, or miniaturized version of the primary object is seen when the container of the primary object is viewed. Icons can be used to move or copy the associated primary object and double-clicking on an icon causes the Task Window in which the icon was seen to view the primary object.

Examples of primary objects are a Folder, a Document, a Visible Data Object (VDO). The VDO acts as a store for data and its dimensions are set by the user. The structure of a VDO can be viewed by the user but the actual data stored in the VDO cannot be viewed directly.

In this embodiment, secondary objects cannot contain other objects. They can only be viewed as part of their container object—they do not have miniaturized (iconic) states. They are used to supplement their container by providing an annotation or more complex representation as will be explained.

The types of object will now be more fully described, firstly window objects and secondly semantic objects.

Window Objects

Window objects also have the basic features of data and associated methods together with a unique identifier and the ability to receive and respond to messages from other objects. However, they differ from semantic objects in that they are transient, i.e., not stored to disc whereas semantic objects are so that they persist even when the relevant machine is switched off. Window objects obtain their data from the System Window and the semantic object which they are viewing rather than from disc.

There are three types of window objects, namely, the System Window, Task Windows and Secondary Windows. Each Window Object has its own unique object identifier. This identifier has an element identifying the storage domain on which the window was created and an element which is unique within that storage domain.

Figure 2:
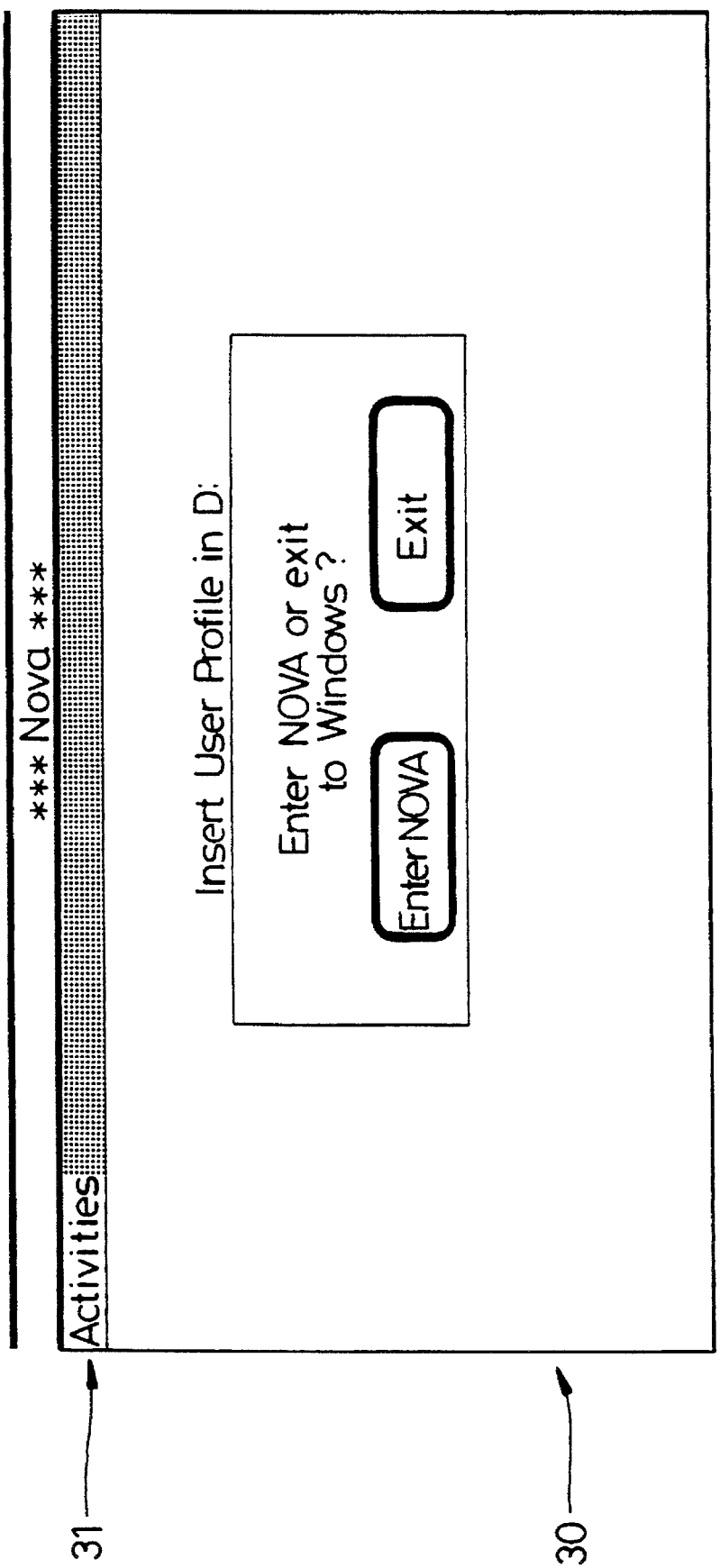
FIG. 2 shows the System Window.

The System Window is started automatically by the OM 16 and remains in memory while the system 10 is running, controlling the creation, destruction, opening and closing of Task Windows. The System Window also handles a user logging in and out of the system 10. FIG. 2 shows the System Window 30 which covers the whole screen and acts as a background once a user has logged into the system. There is an "Activities" Menu bar 31 at the top of the System Window. The System Window 30 simply gives the user the option of entering the system (NOVA) or exiting.

Figure 3:
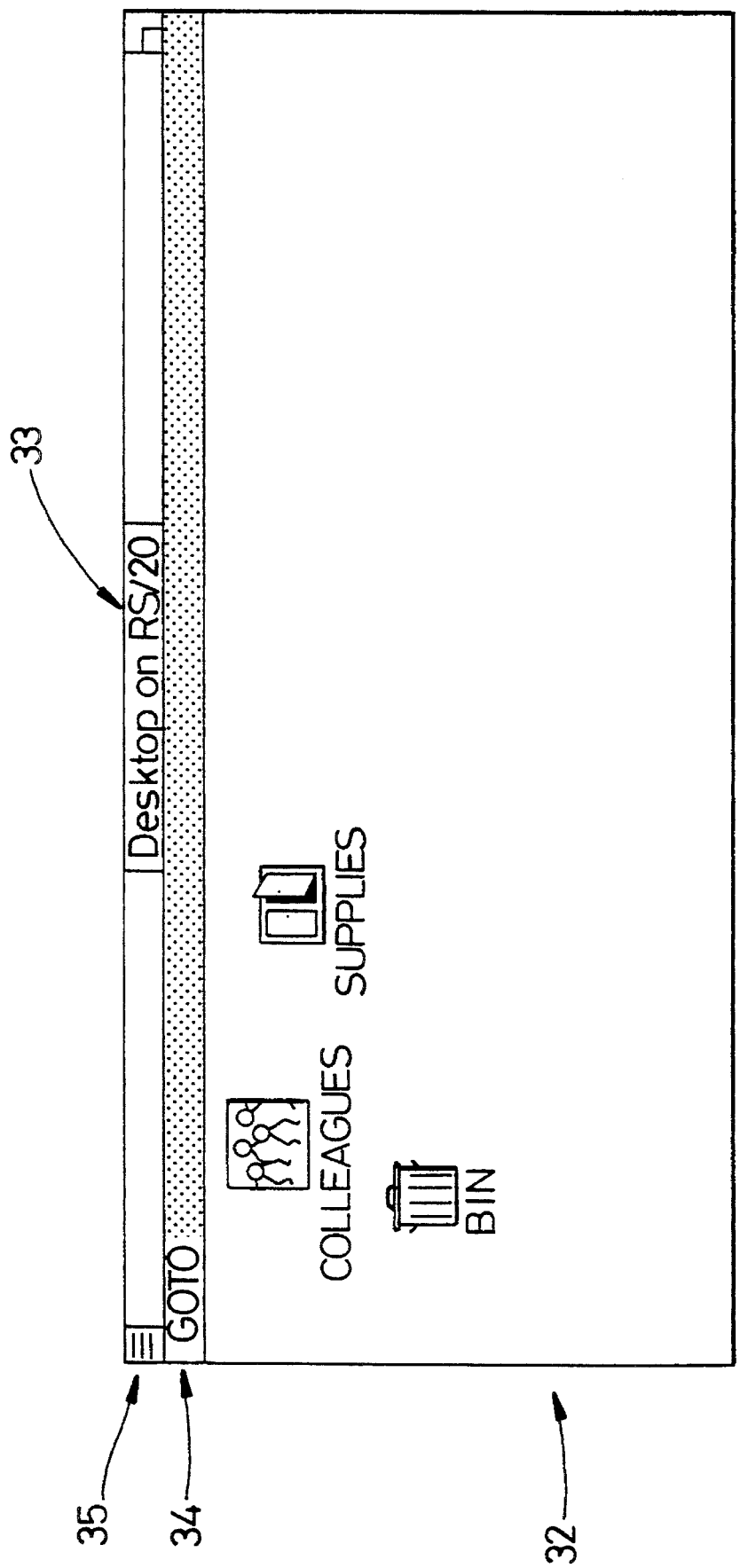
FIG. 3 shows a typical Task Window.

Each user has up to seven Task Windows at their disposal. The user can control the size and position of a Task Window as well as choosing which object the Task Window is to view. FIG. 3 shows a typical Task Window 32. The title 33 of the Task Window 32 shows the name (Desktop) of the object which the Task Window 32 is viewing and the name of the machine (RS/20) on which that object resides. The Task Window 32 has a menu bar 34 which has a "GOTO" pull-down menu and may have other pull-down menus depending on the type of object being viewed. In the example of FIG. 3, the Desktop object is seen to contain three objects—Colleagues, Supplies and Bin.

A Task Window may be either visible (open) or invisible (closed). The System. Window 30 controls the opening and closing of Task Windows and the user can close a Task Window by double-clicking its "system box" 35. In this way a user may have several tasks running in the background and switch rapidly between them.

A Task Window can only view one primary object at a time. By clicking on an icon or button (see section entitled "Semantic Objects") the Task Window can be switched to view a different object.

Each user has up to seven Task Windows at their disposal. The user can view up to seven primary objects at the same time by creating the required number of Task Windows and navigating these to chosen objects.

The System Window stores data for each Task Window that it controls, namely:

a) Task Window Object ID b) Window Handle (an internal identifier used for the windows software 22)

c) Border Color d) Open/Closed Flag e) Window Icon Flashing Flag f) Object ID of object being viewed by Task Window;

g) Icon and title of viewed object.

To create a Task Window 32, a user selects the "Create" item from the "Activities" menu. The System Window 30 updates its internal window information and sends a Window Create message to the new Task Window 32 containing the above information.

The System Window 30 disables all user input before sending this message and re-enables it on receiving a Window Create Done reply message from the new Task Window.

There is a Task Window subsystem which handles all operations forming part of the viewing mechanism such as moving and sizing the window, shutting the window, changing the object viewed, etc. Operations which are specific to the object to be viewed are handled by a dynamic link library suitable for that class of object. The dynamic link library is unloaded when the Task Window is no longer viewing that object.

Each Task Window stores the Object ID of the primary object which it is viewing and information about which part of that object is being viewed. The Task Window also stores the name of the relevant dynamic link library for the object which is being viewed.

There can be more than one Task Window viewing an object at any one time so that, in a distributed system, a plurality of users can view the same object at the same time.

Figure 4:
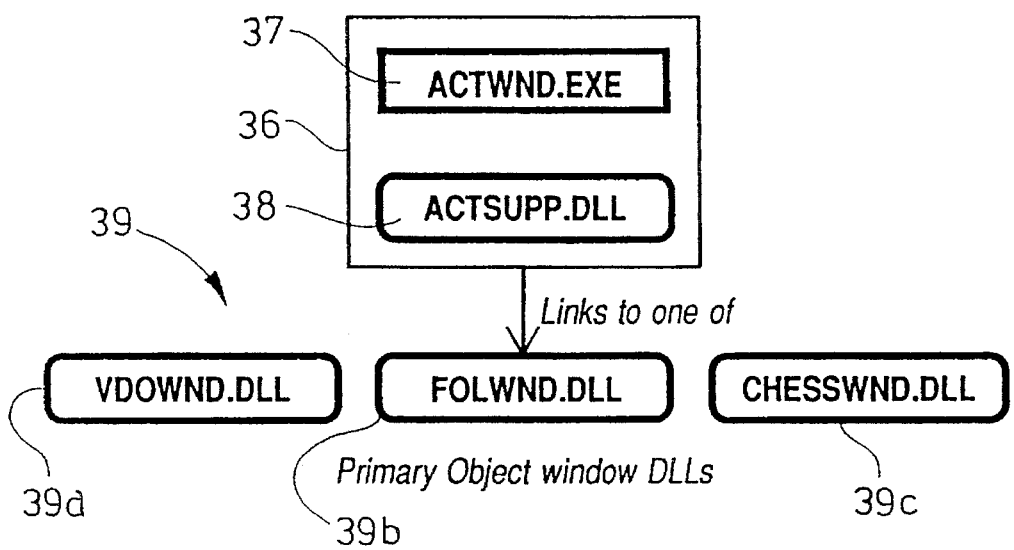
FIG. 4 shows a Task Window subsystem.

FIG. 4 depicts a Task Window subsystem 36 comprising a main program 37 for activating Task Windows and a supporting library 38. The subsystem 36 is linked to one of a set of dynamic link libraries 39 for different classes of object. For example, the set 39 includes dynamic link libraries for VDO, Folder and ChessBoard primary objects referenced 39a, b and c respectively.

The dynamic link library 39 caches information enabling the repainting of the relevant presentation object, or part of it as appropriate, without the need for communication with the semantic object. During operation, the Task Window sends generic information to the Task Window subsystem 36 and sends information specific to the particular presentation object to the relevant dynamic link library 39.

A Task Window 32 can display any type of semantic object and it is a Primary Window in the sense that it can be linked to any primary object type, e.g., Folder, VDO, etc. If the primary object which a Task Window is viewing contains a secondary object, e.g., a Bar Chart, the Task Window creates a Secondary Window and links it to the secondary object as will be described. These Secondary Windows are created automatically when a user views a container of one or more secondary objects and are also destroyed automatically when the user moves the Task Window from the container.

Task Windows are linked to semantic objects by a GOTO operation. This will often involve a GOAWAY operation.

The first step in the GOTO operation is for the Task Window to send an AddViewer message to the desired object. This object will store the Task Window ID and reply with a Here Contents message.

The first part of the Here Contents message provides information on the object ID, class, icon and the relevant dynamic link library 39. This causes the subsystem 36 to load the relevant dynamic link library 39. The remainder of the Here Contents message is private to the object and is passed to the dynamic link library 39.

If the object to be viewed contains any secondary objects, the Task Window creates a Secondary Window for each secondary object. A Secondary Window is a child window used to display and interact with a secondary object on the surface of a primary object which contains it. Secondary Windows differ from Task Windows in that they are created to view one object and are destroyed when that view is no longer needed whereas Task Windows are used to view many objects in succession.

Figure 5:
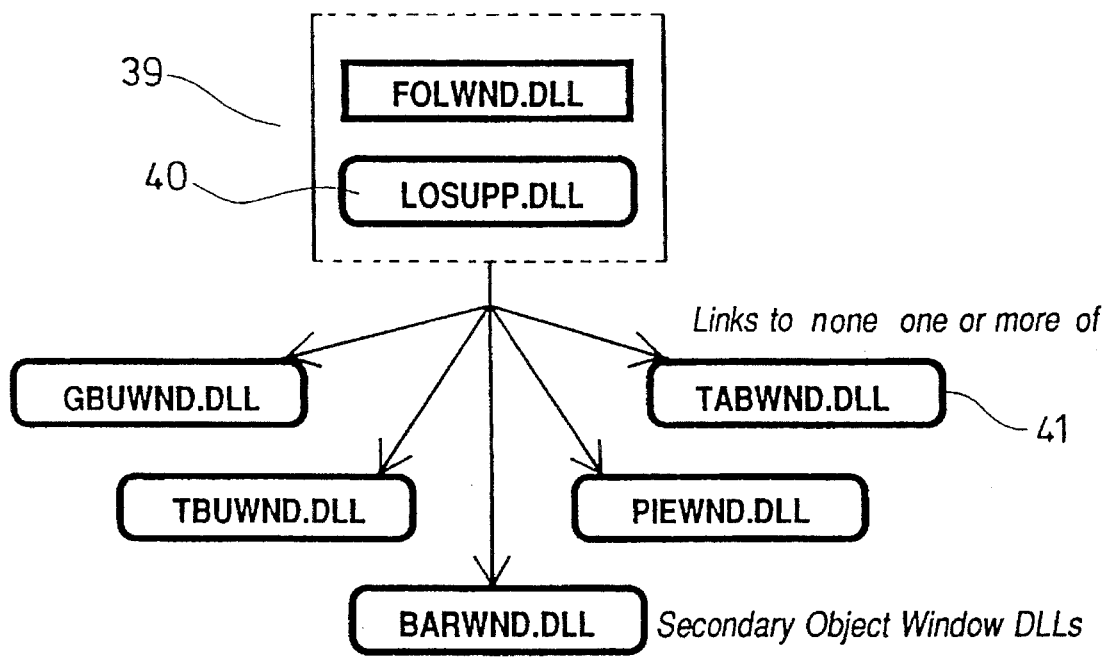
FIG. 5 shows a dynamic link library subsystem.

When a dynamic link library 39 for a primary object initially receives a Here Contents message, that will include a list of contained secondary objects. Referring to FIG. 5, the dynamic link library 39 uses a support library 40 to provide it with utility functions including the creation and registration of Secondary Windows for any contained secondary objects. The support library 40 stores the ID of the contained secondary objects and their position in the primary object.

An Add Viewer message is sent to each such secondary object. In due course each such Secondary Window will receive its own Here Contents message including the name of the secondary object dynamic link library 41, for it to use. This secondary object dynamic link library is then loaded and all messages for the Secondary Window are passed to a window procedure in the secondary object dynamic link library 41.

The GOAWAY operation starts by the Task Window sending a Remove Viewer message to the viewed object. If the Task Window has created Secondary Windows, this message is also broadcast to them causing them to destroy themselves. All objects which receive the Remove Viewer message update their list of windows and reply with a Viewer Removed message. The Task Window knows how many replies to expect and, when these are received the GOAWAY operation is complete. The Task Window may then view another object, or shutdown or destroy itself.

To destroy a Task Window, the user selects the Destroy item from the Activities menu 31. The mouse can then be moved and clicked anywhere on the screen, but all other user input is temporarily disabled. If the mouse is clicked over a Task Window, the System Window sends a Window Destroy message to that Task Window which replies with a Window Destroy Done message. The Window Destroy message causes the Task Window to initiate a GOAWAY operation as described above.

Figure 6:
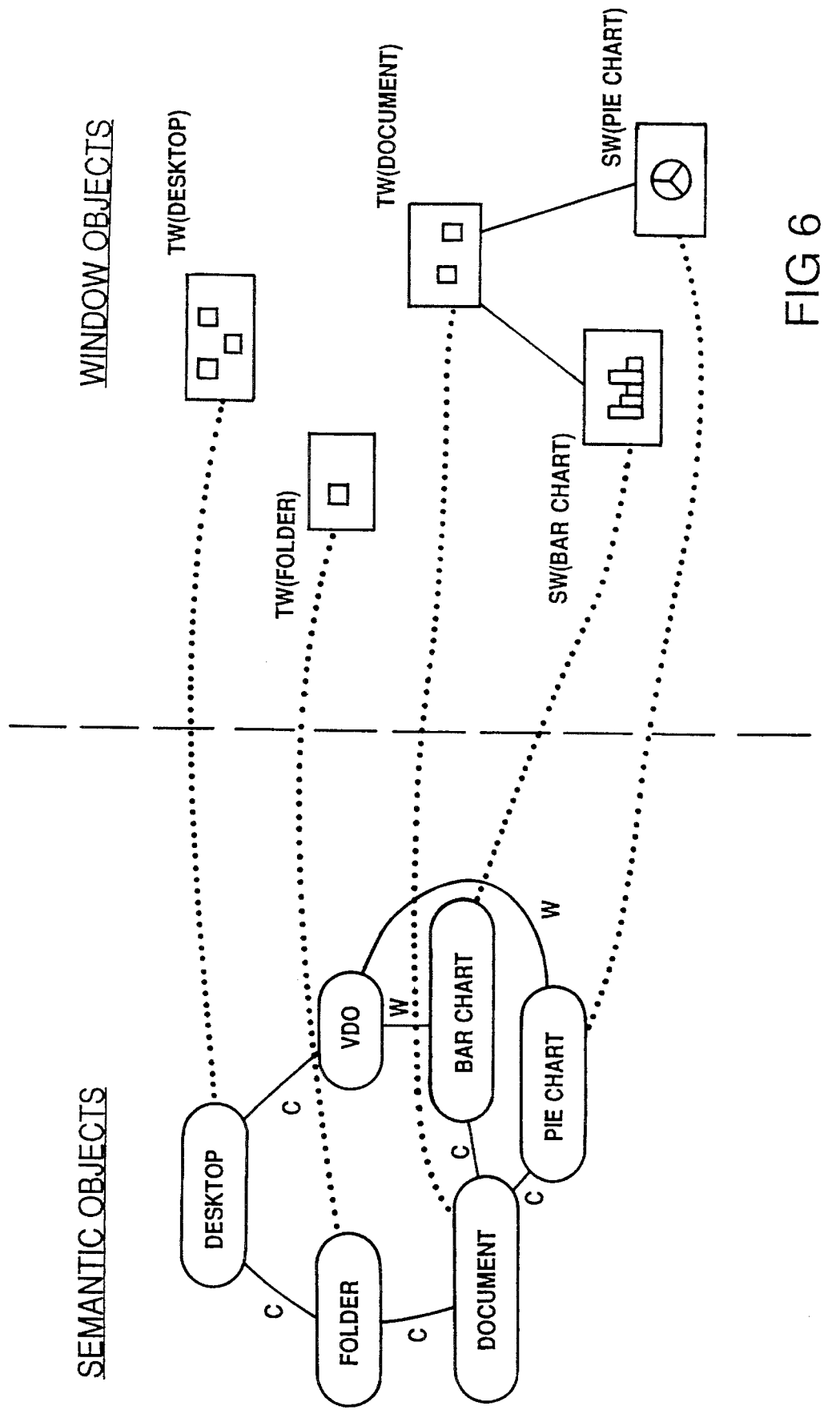
FIG. 6 illustrates links between objects.

FIG. 6 illustrates the links between semantic objects and between window objects as well as windows communication links (shown dotted) between windows and the objects which they are viewing. Container links between system objects are marked C and weak links between primary and secondary objects are marked W. Window communication links and links between windows are transient and disappear when the user's machine is turned off whereas the links between system objects are persistent.

In FIG. 6 there are three Task Windows viewing the Desktop, Folder and Document respectively. The Task Window viewing the Document has two Secondary Windows viewing the Bar Chart and the Pie Chart which have weak (updating) links to the VDO. No window is viewing the VDO directly.

The data in a Visible Data Object (VDO) is not directly viewable but the structure of the data is viewable.

Icons representing contained primary objects are shown as boxes in the Task Windows. Instead of opening new Task Windows it is possible to view the desktop, Folder and Document in succession with a single Task Window by clicking on the relevant icons.

Semantic Objects

As mentioned above, there are primary and secondary objects in the system 10.

In the system 10 there are two distinct types of object linkages: containment links and weak links. The containment link largely determines where an object is physically located as explained previously and can only be present between two primary objects located in the same storage domain or a primary object and a secondary object located in the same storage domain.

An object can only be contained by one other object—if its container is destroyed, so will be the object.

Weak links are currently between a primary object and a secondary object. Weak links can be established between objects located in different storage domains and do not affect the containment of an object.

There are two main types of secondary object: the Button and the Representation.

A Button itself has two possible functions: firstly it may provide text or graphic annotation for its container and secondly it may permit traversal to a primary object to which it is linked.

A Representation may be linked to a part of a VDO (Visible Data Object) and it will display the information held by that part of the VDO in a form which depends on the nature of the Representation, e.g., a Pie Chart, Bar Chart or Table. Changes made to the data in the VDO will be reflected in the Representations linked to the VDO and the data held by the VDO can be altered by altering the data shown by a Representation linked to the VDO.

Further details of the link between a VDO and Representation objects are disclosed in copending International Patent Application of even date and claiming priority from UK Patent Application No. 8917490.8.

Figure 7:
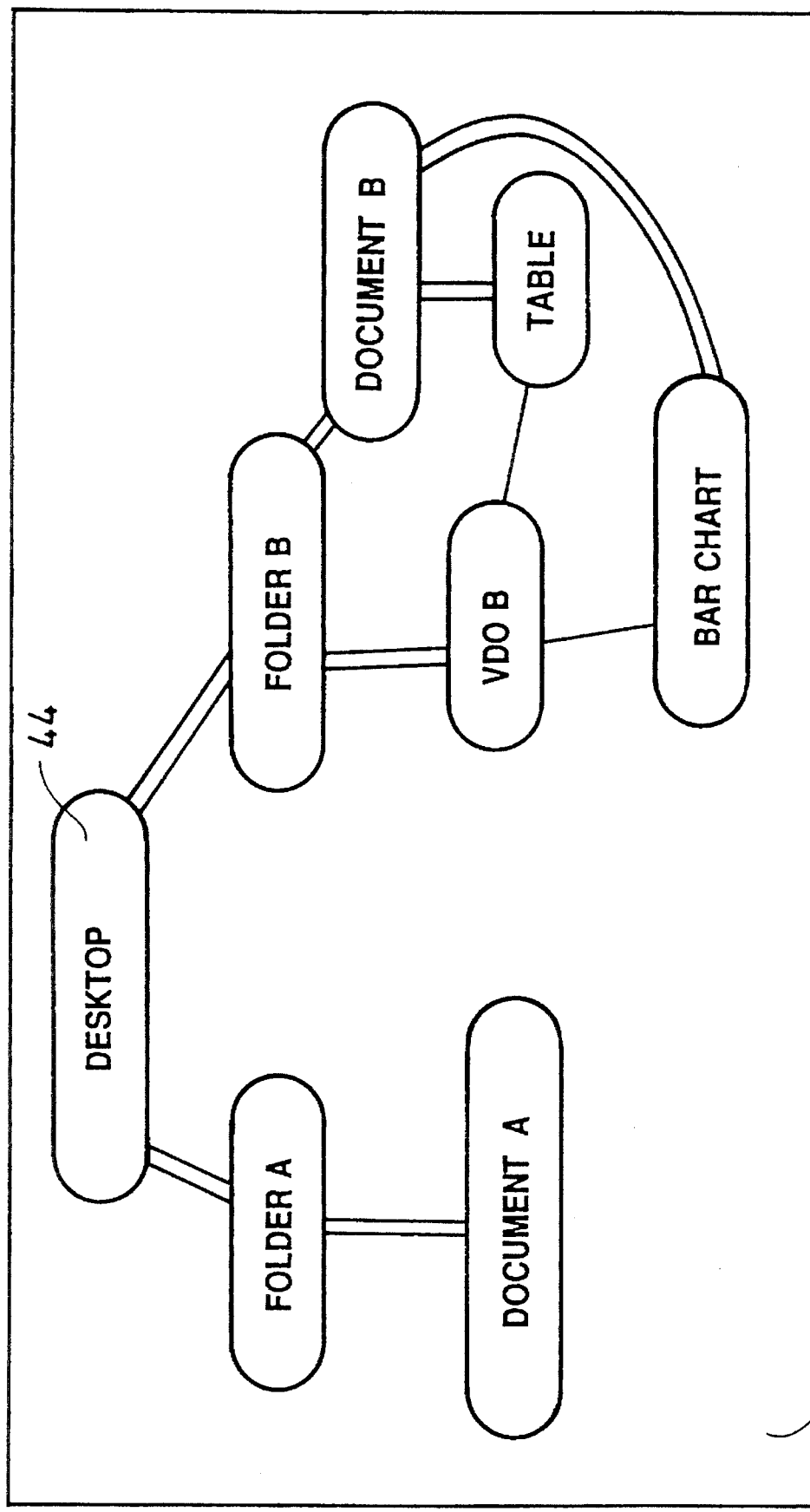
FIG. 7 is a schematic representation of links between objects in a single storage domain.

FIG. 7 shows schematically a set of possible links between objects in a single storage domain 42. Each user has a Desktop object: Desktop 44 which contains all of the other objects in the storage domain 42. The Desktop 44 is the only object which has no container and it may not be moved, copied or destroyed. FIG. 7 shows the Desktop 44 containing two Folder objects: Folder A and Folder B as indicated by (double-line) containment links. Folder A contains a document object: Document A. Folder B contains a Visible Data Object: VDO B which has (single-line) weak links to Representation objects: a Bar Chart and a Table. Folder B also contains a primary object, Document B, which contains the Table and Bar Chart Representation objects.

Each object stores information identifying the objects to which it is linked and the nature of the links. FIG. 8 shows some of the information which is stored in respect of each of the objects shown in FIG. 7.

In addition, each primary object stores the position of the objects which it contains. Contained objects do not store information on their position in the object containing them. Primary objects also cache data defining their icon. Regarding weak links, the secondary object stores information about which part of the primary object it is linked to whereas the primary object does not store such link location information.

Secondary objects cannot contain other objects. There are some limitations on the container properties of primary objects: document objects can only contain secondary objects and certain primary objects, e.g., Chessboard, VDO cannot contain other objects.

Different weak links can have different effects depending on the methods of the linked objects and the nature of the data sent over the link. For example, a weak link between a button and a primary object may be a traversal link set up so that when the user clicks on the button, the Task Window viewing the primary object containing the button switches to view the primary object weakly linked to the button. In contrast, a weak link between a VDO and a Representation object may be a two-way updating link so that changes in the VDO are reflected in the Representation object and vice-versa. It is also possible to have a traversal-type of weak link between a VDO and a Representation object so that clicking on the Representation object causes traversal to the VDO.

It is also possible to have a weak link between two secondary objects to establish a "traversal chain". For example, linking a first button in Folder A to a second button in Folder B which second button is linked to Folder C. Clicking on the first button will cause the Task Window viewing Folder A to switch to Folder C. This feature enables more complex cross-referencing between user items.

Object Messaging

Figure 9:
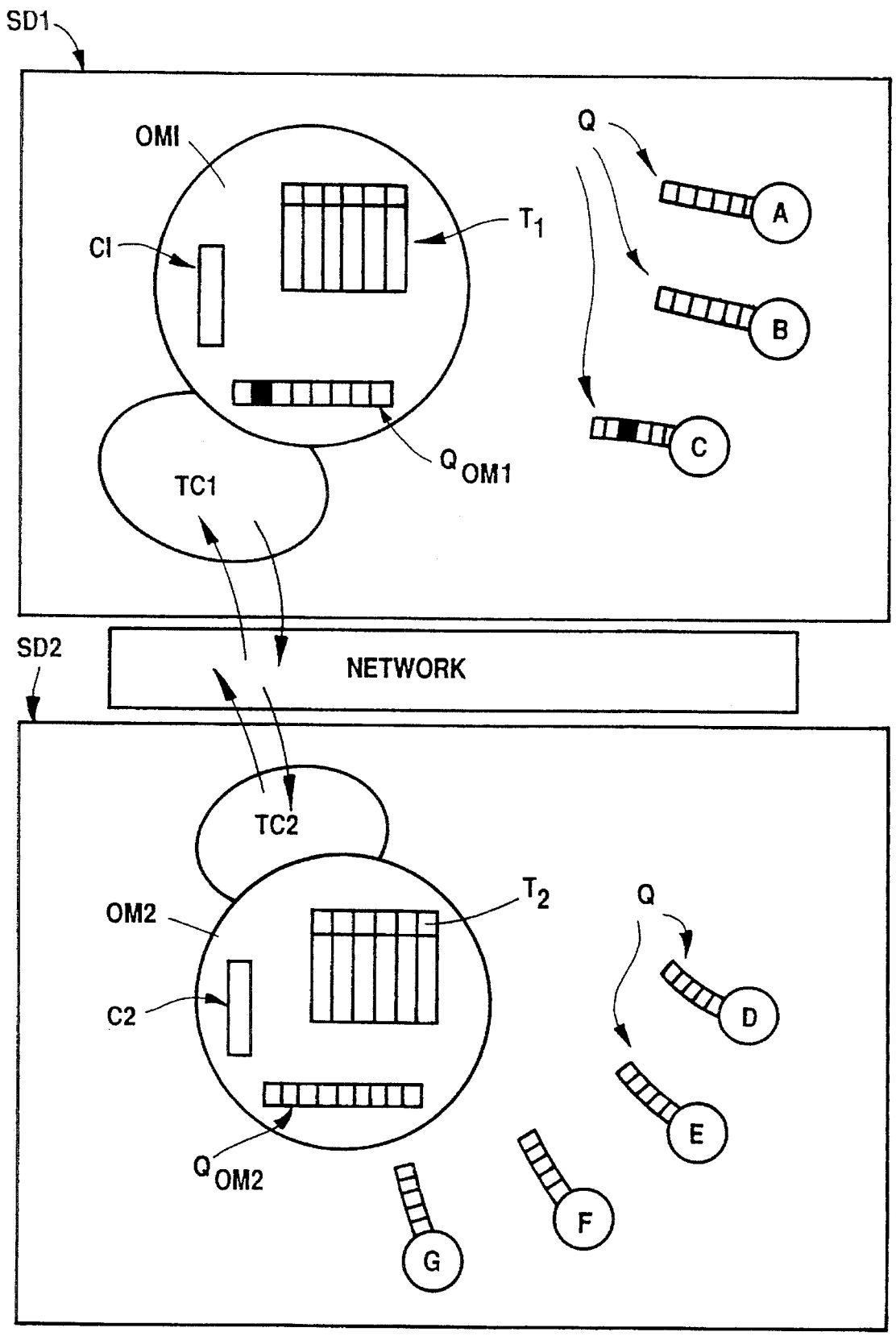
FIG. 9 depicts message transfers in the system.

Objects intercommunicate by sending messages to one another. All messages are routed through the object manager (OM) local to the object transmitting the message. FIG. 9 depicts two storage domains SD1 and SD2 on a network. In each storage domain there is an OM and a transport controller TC (incorporating the DMS 18 and Local area networking software 20 of FIG. 1) for sending and receiving messages over the network. Semantic Objects (A, B, C, etc) each have their own message queue Q for incoming and outgoing messages. Each OM also has a message queue $Q_{OM}$ and a table T containing information about objects in that storage domain.

Referring to FIG. 9A, the table T of each OM records the general object type, i.e., whether window object or semantic object and the specific object type such as Folder, Button, etc,. The table T also stores the object ID's and flags $F_1$, $F_2$ and $F_3$ indicating respectively whether a semantic object is active and whether it is in the process of closing down (i.e., has a QUIT message been posted) or deregistering (i.e., has a Deregister message been posted).

Each OM also has a cache C containing the object ID's and current locations of objects to which messages have recently been sent.

Outgoing messages are sent from the message queues of objects A, B, C in storage domain SD1 to the message queue $Q_{OM}$ of OM 1. The target of a message is specified in each message as an object ID. Each object ID comprises a part identifying the storage domain in which that object was created and a part which is unique in that storage domain.

On receiving a message, the OM1 checks its table T to see whether the target of the message is in its own storage domain SD1. If so, the OM1 sends the message to the message queue Q of that target object. If the target object is not local, say the target is object E on storage domain SD2, the OM1 checks its cache C1. If the target object is not listed in the cache C1, the OM broadcasts a search message onto the network, via the transport controller TC1, identifying the target object. In response, all OM's on the network search their tables and the one containing the target object in its table replies. The message is then sent over the network from OM1 to OM2 in the storage domain SD2 (in this case) via transport controllers TC1 and TC2. The message is then sent from the message queue $Q_{OM2}$ of OM2 to the message Q of the target object E.

If a target object moves while a message is being sent to it, the posting process begins again.

A message may specify more than one target object in which case each of the target objects is located in the manner described above and the message is despatched to all of them.

The addressing mechanism for a message depends on whether the target is a semantic object, a Task Window or a Secondary Window. All messages received by a semantic object are for that object, messages received by a window object may be for that window object or for a Secondary Window of that Task Window. Messages contain an indicator as to whether they are for a semantic object or a window object.

Certain messages have special significance because these signify that an object is moving to another storage domain or is closing down. Such messages are shown blacked in on FIG. 9 and will be referred to later when describing the DeRegister and Destroy operations.

How semantic objects can be manipulated and the effect of containment and weak links between semantic objects will now be described.

Object Manipulations

System Objects can be created, destroyed, moved, copied, linked and unlinked. These and other object manipulations will now be described in more detail.

The messages involved in each manipulation are shown in Appendix A. Parameters contained in a message are shown in parentheses after the name of the message.

Create

A user logging in to the system 10 for the first time automatically acquires a Desktop (FIG. 3) which contains certain objects: a Bin, a Colleagues Folder and a Supplies Cupboard. The Supplies Cupboard contains templates for each possible type of semantic object, which templates can be copied but not moved from the Supplies Cupboard. A copy of a template object is an ordinary object which can be moved, copied, destroyed, etc.

To create a new object, an existing primary object sends a Copy message to the Supplies Cupboard containing the identity of the existing object and the sub-class of object to be created. This causes a copy of the relevant template in the Supplies Cupboard to be made and the new object sends a Copy Done message to its container together with its object identifier which it obtains from OM 16. The new object is entered in the records of the OM 16 and the records of its container object. The Desktop is a special case—as it has no container it sends its Copy Done message to the System Window instead. The copy operation is described in more detail subsequently.

Destroy

When a user wishes to end a session the System Window sends a Flush message to the Bin. In response, the Bin sends Destroy Yourself messages to the objects it contains and the objects reply with a Destroy Done message. When the Bin has received Destroy Done messages from all of the objects which it contains, the Bin sends a Flush Complete message to the System Window.

Generally, on receipt of a Destroy Yourself message an object (Object i in Appendix A) does two things before quitting:

i) it broadcasts an Unlink message to all of the objects to which it is weakly linked. If Object 1 is a primary object it may be weakly linked to one or more secondary objects and sends a Hi to Lo Unlink message to these secondary objects. If Object 1 is a secondary object it may only be weakly linked to one primary object and sends a Lo to Hi Unlink message. There is no reply to the Unlink message;

ii) if it is a primary object, it destroys all of the objects (Object 2 in Appendix A) which it contains by sending each of them a Destroy Yourself message and waiting for a Destroy Done reply.

Once actions 1) and 2) above are completed, the object sends a request for deregistration to the OM and deregistration proceeds as described below. Just before quitting, the object sends a Destroy Done message to its parent.

Register/Deregister

An object only exists in the system if it is registered with the OM 16 of the storage domain in which it is located. Newly migrated objects are registered by their container objects. Once registered, an object will remain so until it is destroyed or moved to another storage domain.

Deregistration occurs when an object is destroyed or moved to another machine. The deregistration process involves the object sending a request for deregistration (a message blacked in in FIG. 9 as distinct from the other messages shown) after which the OM will refuse to accept any more messages for the object and will put a Deregistered message at the end of the queue of messages for the object. When the earlier messages in the message queue have been sent, the Deregistered message is sent to the object. The entry for the object in the table T of the OM is then deleted. When the object receives the Deregistered message it closes down.

Activate

Semantic Objects are either active or inactive. An object is active if it has a task assigned to it in which case its state is stored in RAM and it may use the processor of its host machine. When inactive, an object exists only as a disc file.

On receiving a message for an active object, the OM passes the message to the task (i.e., methods) associated with the object. On receiving a message for an inactive object, the object must be activated and this involves procedure calls. The OM creates a process for the object using a procedure to start an instance of the correct type of object. This process does two things firstly it calls the OM Activate (Task) procedure to inform the OM of which queue to send the incoming message. The task also calls a Get My Object ID procedure in the OM which returns the object ID. The task then reads the object's state into RAM. The object is now active.

Deactivate

Deactivation of objects occurs in two ways and also involves procedure calls. The object may request its own deactivation by calling a Deactivate Request procedure in the OM and the OM then sends the object a QUIT message. Alternatively the OM may send an object a QUIT message so as to control the number of active objects on a machine according to the resources available. An object which receives a QUIT message saves its state to disk, calls a Deactivate Acknowledge procedure in the OM and quits its process.

Move

The degree of complexity of the operation of moving an object depends on whether the object has children and on its target location.

Figure 10A:
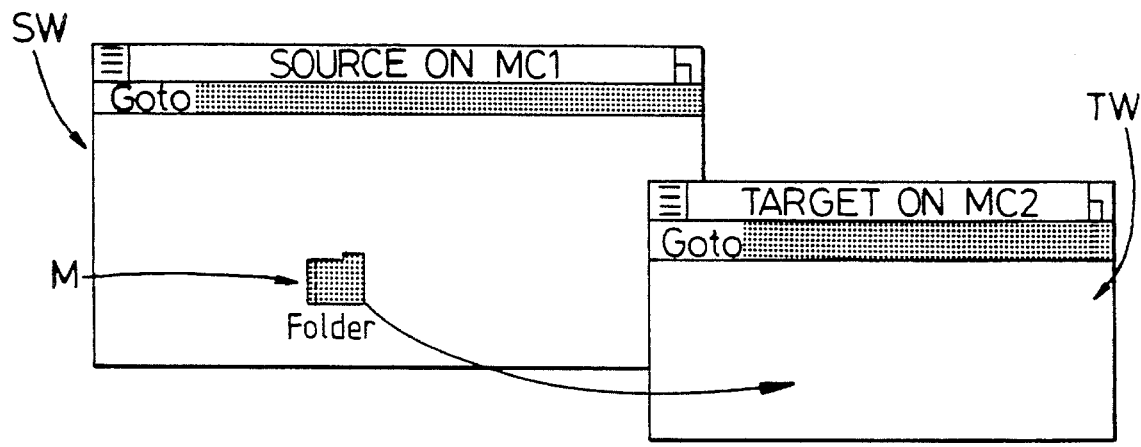
FIG. 10a illustrates a Move operation performed by a user.
Figure 10B:
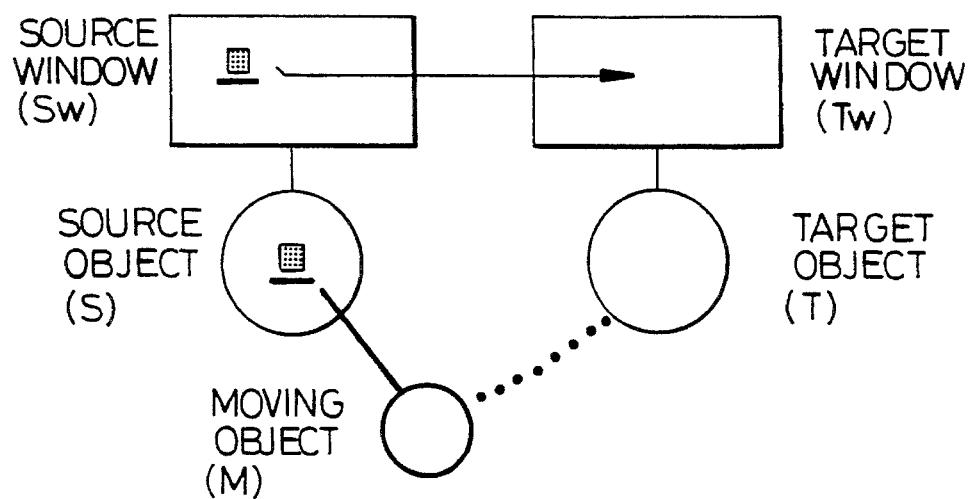
FIG. 10b depicts the objects involved in a Move operation.

FIG. 10a illustrates the action of a user moving a folder object M from a source window (SW) on a first machine (M/C 1) to a target window (TW) on a second machine (M/C 2). FIG. 10b illustrates the objects involved in the move operation, namely, the source window (SW), the target window (TW), a source object (S), a target object (T), the moving object (M) and child objects $C_1$ and $C_2$ of the moving object M.

The move operation begins when a user moves an icon representing a primary object, or a secondary object, from one window to another, e.g., by dragging these items across the screen using a mouse. The validity of attempting to send a message initiating a move operation to the target object is checked by the presentation system and the target object decides whether such a move is acceptable and the operation is aborted if the attempted move is not valid, e.g., if the user is trying to move an object which cannot be moved, such as a Supplies Cupboard object.

The source window SW obtains from the target window TW the object ID of the target object and the position within the target object to which the moving object M is to move.

The source window SW sends a Move Object message to the source object S. If the source object S and the target object T are in fact the same object, the user has simply adjusted the position of the moving object M within its current container and the source window S updates its tables and informs its windows by sending a Move Local message. All windows which receive this message update their tables and repaint the moving object M.

If S≠T, so as to avoid potential problems caused by interleaving of two or more move/copy operations, a lock is put on the relevant machine so that no more move/copy operations can be initiated until the current operation can be completed. This is done by S sending a Move Copy Lock message to the OM 16. If this call fails the move operation must be aborted and S sends a Can't Move message to SW which causes a warning message to be displayed to the user. If the call succeeds, S sends a Move Yourself message to M. If M is an object which is not allowed to be moved, it sends a Won't Move message to S which causes a warning message to be displayed to the user in SW.

If M can move, it sends a Remove Object message to S. This causes S to remove M from its object tables and to send Remove Object messages to all of the windows viewing S. These windows then remove M from their tables and repaint.

If M is already on the same machine as T the move operation is relatively simple. M sends an Insert Local message to T which causes T to insert M into its object tables and send Insert messages to the windows viewing T which will draw M. M then sends a New Parent message to all its viewers to inform them of its change of containership and sends a Move Complete message to S. S then triggers release of the Move Copy Lock.

If M and T are on different machines, M must deregister so that the OM 16 on its current machine stops accepting messages for it. However, if M has children, it needs to be able to monitor Move Complete messages from its children therefore M re-registers itself using a new object ID. M then sends an Insert message to T containing a serialized form of M allowing T to write the data for M to disk and to register M on the new machine.

At this point there are two copies of M: the original (Old M) which now has a new object ID, and the moved (New M) which is using the correct object ID for M. It is Old M which controls the move operation.

T then inserts New M into its tables and sends Insert (New M) messages to its viewers which causes the windows to repaint accordingly.

Old M then sends a New Node Prompt message to New M to prompt it to update its state and inform its viewers of its new location. Old M also sends a New Parent message to all viewers of New M.

If M has no children it now sends a Move Complete message to S and deregisters and destroys itself.

If M has children it sends a Send Yourself message to one of its children C. C checks to see if it is already on the same machine as New M. If so it replies with a Move Complete message; otherwise it deregisters itself. When deregistered, C sends a Register Me message containing a serialized form of C to New M which causes New M to write C's data to disk and to register C on its machine.

If C has children of its own, it sends a Send Yourself message to one of them and waits for the Move Complete reply. Note that, if C has children of its own it needs to go through the process of deregistering and reregistering under a new object ID as described above with reference to M so that there exist two objects, Old C and New C for a period,. Old C sends one of its children a Send Yourself message and waits for the Move Complete reply. This is a recursive operation and eventually Old C will have moved all of its children. It then sends a Move Complete message to Old M and destroys itself. Old M then deletes C from its list of children and sends a Send Yourself message to another child. When Old M has moved all of its children it sends a Move Complete message to S and destroys itself. S then triggers release of the Move Copy Lock and the operation is complete.

Thus once an object has been moved to a different storage domain, it acquires a new parent in the new storage domain. The child (and further descendant) objects of the moved object are moved with their parent/ancestor.

As mentioned previously, the Move operation violates the convention that an object and its container are in the same storage domain because the container object moves before the objects which it contains.

An alternative approach would be to transfer an object together with all of the objects which it contains, i.e., all of these objects being off-line at the same time, although this approach has practical disadvantages.

Linking

Figure 11:
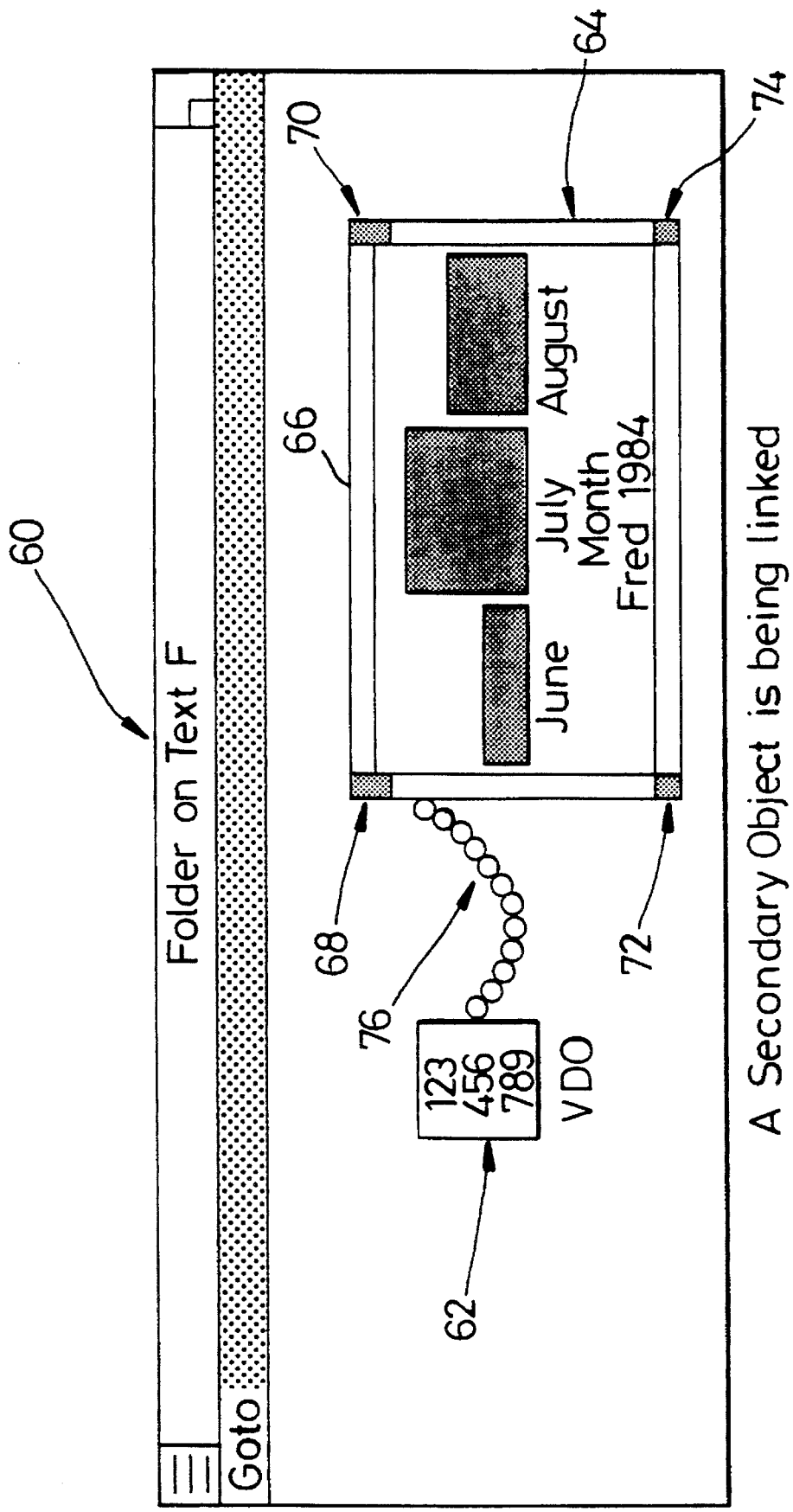
FIG. 11 shows a secondary object being linked to a primary object by a user.

The user is able to link a secondary object (S in Appendix A) to a primary object (P in Appendix A) in the course of a user session. FIG. 11 shows a screen with a view of part of a folder 60 containing a Visible Data Object (VDO) 62 (a primary object) and a Bar Chart (a secondary object).

Each secondary object has a border 66 which appears when the input device, e.g., mouse cursor, is positioned over it. The border has a link box 68, an unlink box 70, and two size boxes 72 and 74. The Bar Chart 64 is linked to the VDO 62 by clicking the mouse over the link box 68 and dragging the mouse to the VDO and releasing the mouse. This causes a "Chain" 76 to appear on the screen.

On releasing the mouse, the Secondary Window (SW) viewing the Bar Chart 64 queries the Task Window (TW) viewing the VDO 62 whether the VDO will accept a link from a Bar Chart. A negative response would cause the operation to be aborted. However, in this case the link is acceptable and a LINK (Target Object) message is sent by the Secondary Window to the Bar Chart. If the Bar Chart 64 is already linked, it sends an UNLINK message to the object (O) to which it is currently linked. The Bar Chart 64 then updates its link data and sends a LINK message to the VDO. The VDO then updates its link data to include the Bar Chart.

In the particular case of a VDO linking to a Representation object, the link must be to a specific part of the VDO. Therefore, the Bar Chart 64 sends a Get VDO Info message to the VDO 62. This causes the VDO to send a description of itself to the Bar Chart. The secondary window SW then displays a dialogue to enable the user to select the part of the VDO to which the Bar Chart is to be linked.

The effect of the Bar Chart 64 being linked to the VDO 62 is that any changes in the relevant part of the VDO are automatically reflected in the Bar Chart. Also, the data in the VDO can be changed by making alterations to the Bar Chart. Other Representation Objects such as Pie Charts and Tables can be linked to a VDO in a similar manner.

The Bar Chart and the VDO may be in different storage domains in a distributed system.

Another type of secondary object is a Button. Buttons serve to decorate primary objects. There are Graphic Buttons and Text Buttons. The user can draw on a Graphic Button or can paste a picture into a Graphic Button. Text can be written onto a Text Button or moved or copied to a Text Button.

Buttons also have another use. They can be linked to a primary object (generally as described above in relation to the VDO and Bar Chart) so that when a user selects a Button this causes the system to switch to viewing the primary object to which the Button is linked.

Generally, if a primary object P is weakly linked to a secondary object S, the following rules apply:

If P or S is moved, P will remain weakly linked to S.

If P is copied, the copy of P will not be linked to S.

If S is copied, P will be weakly linked to both S and the copy of S.

If P or S is destroyed, the one remaining is unlinked.

Unlink

To unlink a secondary object, the user selects its unlink box 70. This causes the secondary window SW viewing the secondary object to send an UNLINK message to the object. The secondary object clears its link data and sends an UNLINK message to the primary object to which it is linked. The primary object then amends its list of linked objects.

In the event of a primary object to which a secondary object is linked being destroyed, the secondary object receives an UNLINK message and clears its link data.

If a Representation, such as a bar chart, is unlinked, it will retain the values and labels which it last received from the VDO to which it was linked. These values can still be changed by a user but such changes will no longer update the VDO.

Copy

The copy operation is somewhat similar to the move operation, but simpler.

Figure 12A:
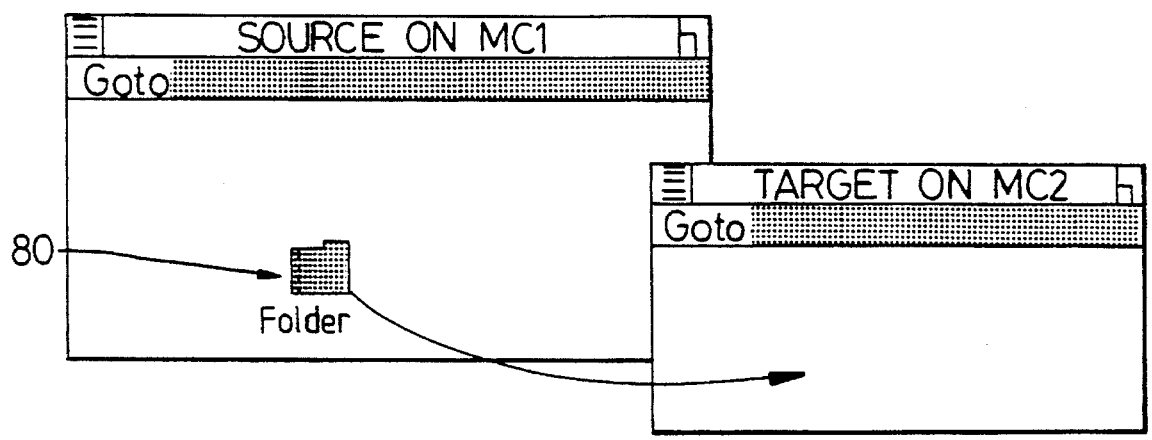
FIG. 12a illustrates a Copy operation performed by a user.
Figure 12B:
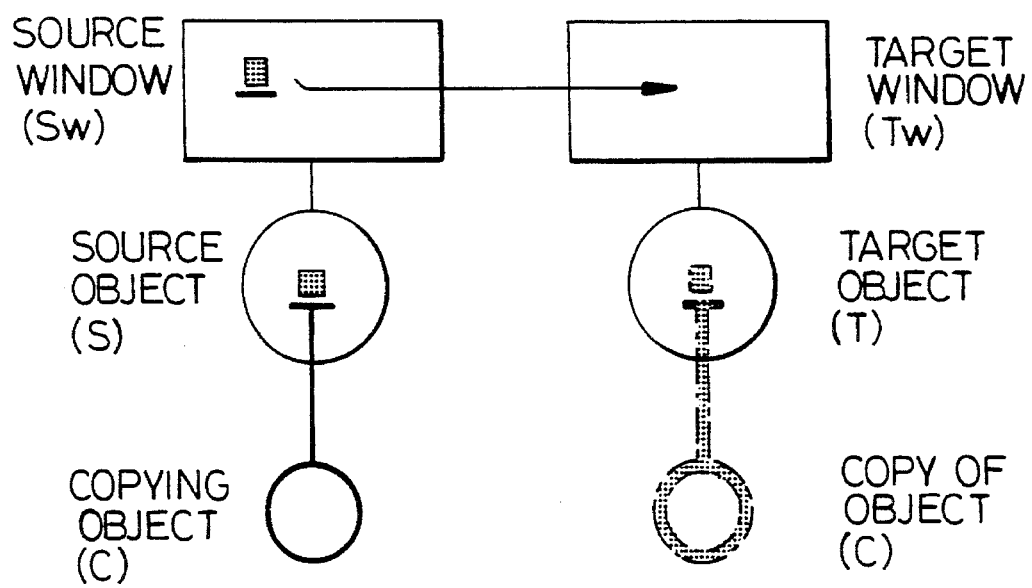
FIG. 12b depicts the objects involved in a Copy operation.

To initiate a copy operation, a user drags an icon or a secondary object from one window to another or to a different position in the same window. FIG. 12a shows a folder icon 80 representing a folder object C which is contained by a source object S (e.g., the Desktop) on a first machine (MC1) and being viewed by a source window SW, being copied to a target object T which is being viewed by a target window TW. FIG. 12b depicts these objects.

If the attempted copy operation is valid, the source window SW obtains from the target window TW the ID of the target object T and an insert position within that target object T. The source window SW then sends a Copy Object message to S. S then calls the OM to place a Move Copy Lock. If this call fails the operation will be aborted and S will send a Can't Copy warning message to the user. Otherwise, S sends a Copy Yourself message to C. If C is a type of object which cannot be copied, e.g., the Bin, it sends a Won't Copy message to S and S in turn sends a Won't Copy message to SW which displays a warning message to the user.

Otherwise, C sends an Insert ($C^1$) message to T which comprises as data a serialized form of C. If C is a secondary object, it sends a Link Yourself message to $C^1$ to prompt $C^1$ to link itself to the same primary object to which C is linked On receiving the Insert message, T registers $C^1$ and inserts $C^1$ into its tables and sends a corresponding Insert message to all of its viewers These windows then insert $C^1$ into their tables and repaint accordingly.

If C has no children, it sends a Copy Complete message to S which then triggers release of the Move Copy Lock.

If C has children, it sends a Copy Yourself message to one of these The child object acts just as C did and eventually will reply with a Copy Complete message C does this for all of its children and finally sends a Copy Complete message to S. S triggers release of the Move Copy Lock and the copy operation is complete.

The ability to link primary objects and secondary objects as described above permits a chain of links to be constructed so as to facilitate cross-referencing between work items and also enables special facilities to be provided. These and other features of the invention will now be illustrated with reference to screen representations.

User Session

This section does not describe a complete user session but serves rather to illustrate the main object manipulations from a user's viewpoint.

Figure 13:
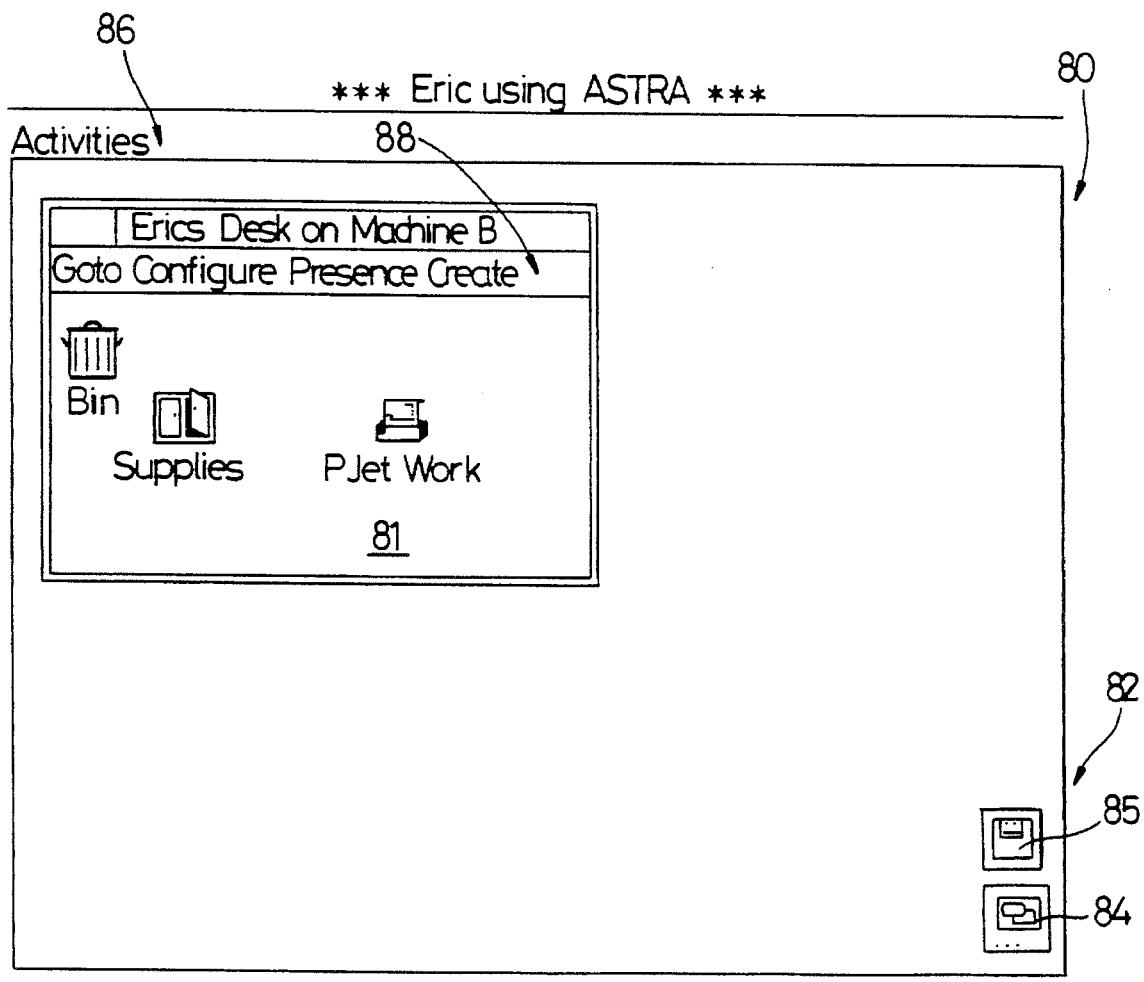

Referring to FIG. 13, a user (Eric) having just entered the system (ASTRA) via the System Window 80 sees the contents of his Desktop through a first Task Window 81. There is a Window Selection column 82 on the right hand side of the System Window 80. The Window Selection column 82 is part of the System Window and is designed to save screen space by enabling a user to minimize (or iconize) a Task Window as shown in the two examples referenced 84 and 85 in FIG. 13 and then to restore the Task Window by clicking on the relevant icon. The System Window 80 has an "Activities" menu bar 86 (as seen previously in FIG. 2) for controlling windows.

The Task Window 81 has a menu bar 88 offering four menus: "Goto", "Configure", "Presence", "Create". In this example, the Desktop contains three objects; "Bin", "Supplies Cupboard" and "PJet Work" therefore three icons can be seen. All three of these objects are primary objects of the folder type although the Bin and the Supplies Cupboard have special properties. Objects can be destroyed by dropping them on the Bin, the contents of which are deleted on log-off. Templates for new objects to be created are stored in the Supplies Cupboard and a user can add further templates.

Figure 14:
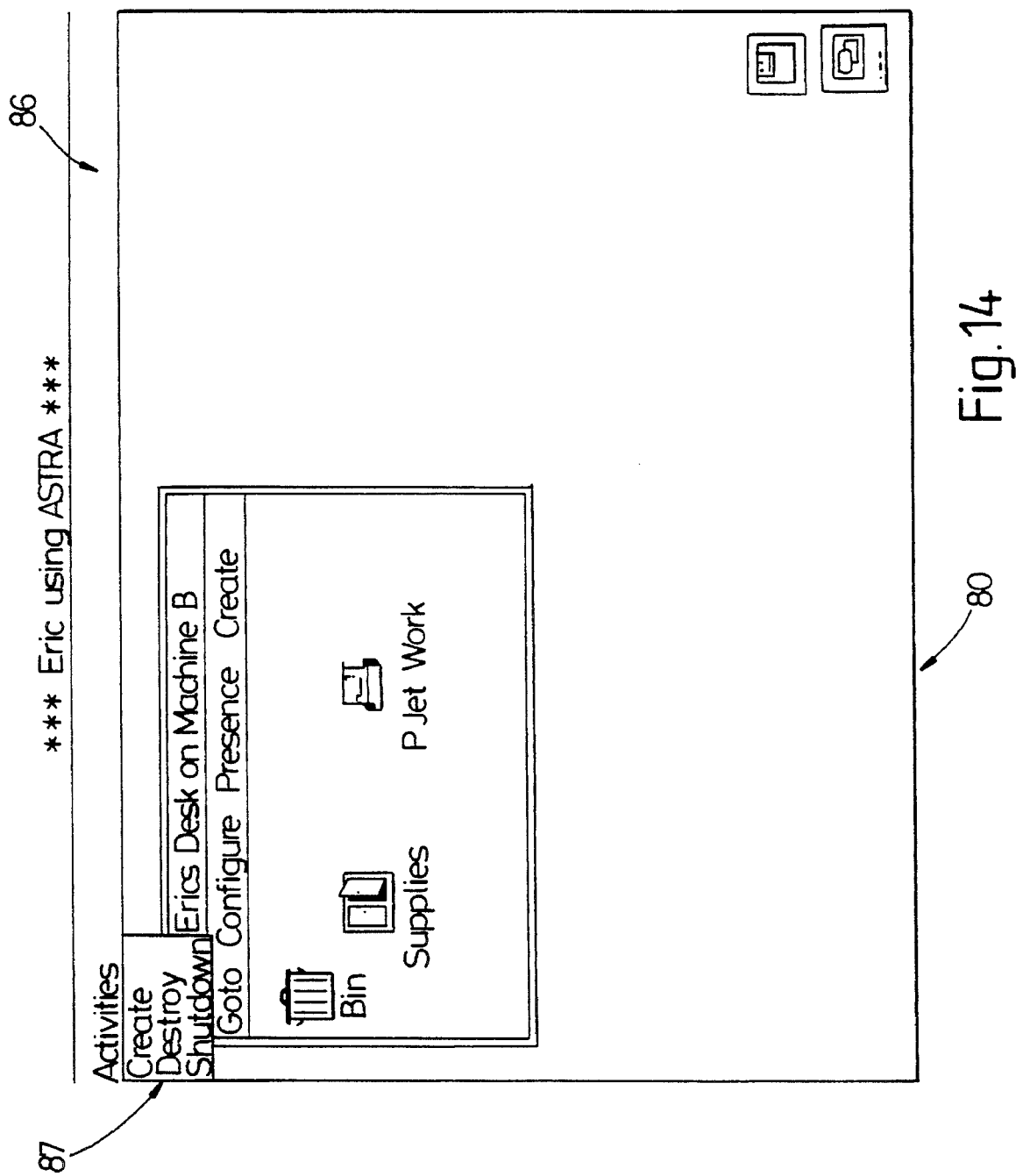
Figure 15:
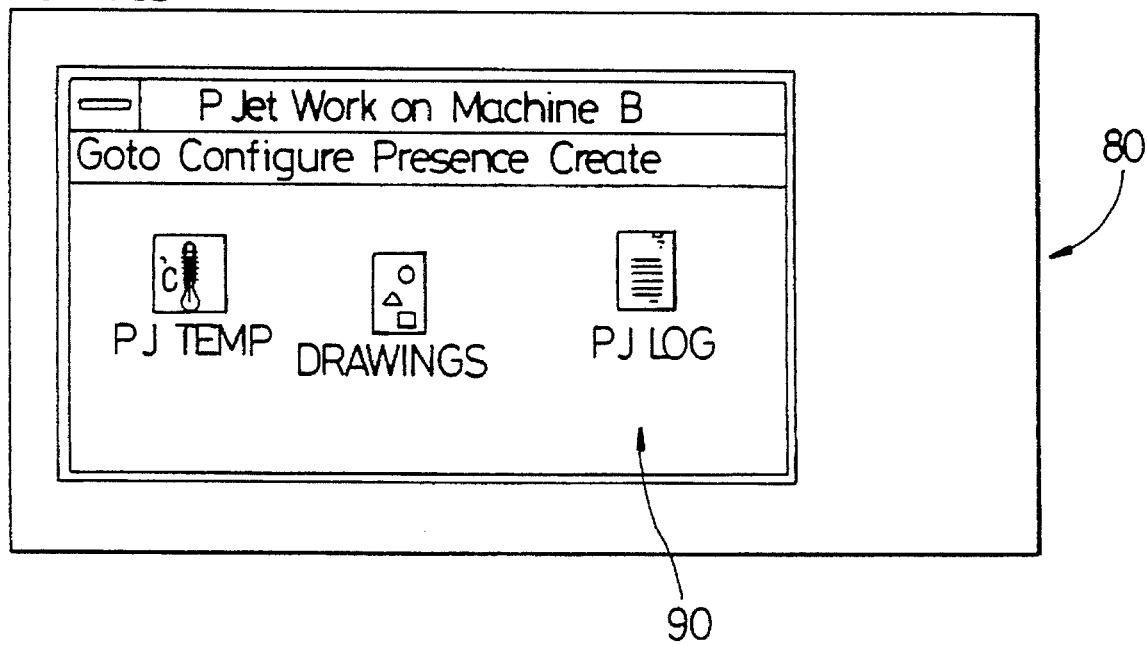

Referring to FIG. 14, on selecting the Activities menu bar 86, a menu 87 having the following three options is displayed: "Create", "Destroy" and "Shutdown". Selecting Shutdown causes the user to log-off. If the user wishes to open a new Task Window on, say, the PJet Work folder, the user selects Create from the menu 87 followed by clicking on the PJet Work icon. This causes the creation of a second Task Window 90 which initially is viewing the Desktop and can be navigated to view the contents of the PJet Work folder as shown in FIG. 15. The PJet Work folder contains three objects: two documents, namely Drawings and PJ Log and a folder PJ Temp. Selecting Destroy and then clicking on a Task Window causes that Task Window to be destroyed.

Figure 16:
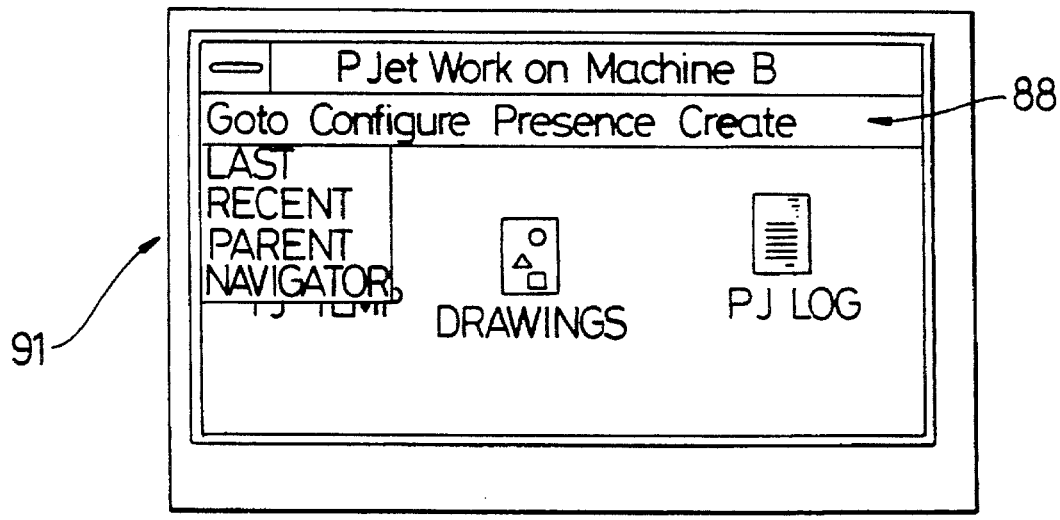

As well as creating a new Task Window to view a different object, it is possible to change the focus of an existing Task Window (as explained previously). To do this, the user selects the GOTO option from the menu bar 88 resulting in a menu 91 being displayed as shown in FIG. 16 having four options: "Last", "Recent", "Parent" and "Navigator". Selection of these options have the following consequences:

Last: causes the system to back track by one window;

Recent: causes a Window History area (not shown) to be displayed showing the icons of objects recently viewed;

Parent: changes the focus of the Task Window to view the parent of the object presently being viewed;

Navigator: a specialist function that will not be described here.

The "Configure" option on the menu bar 88 enables the GoTo menu to be edited.

Figure 17:
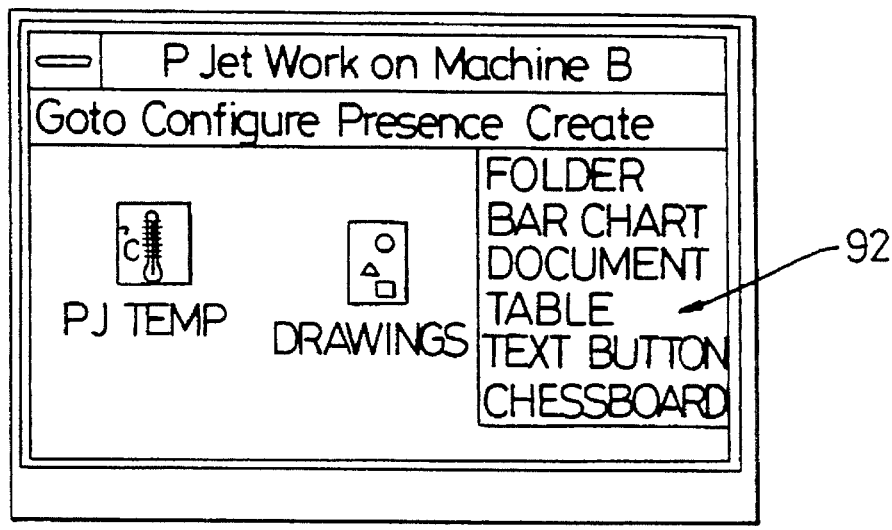
Figure 18:
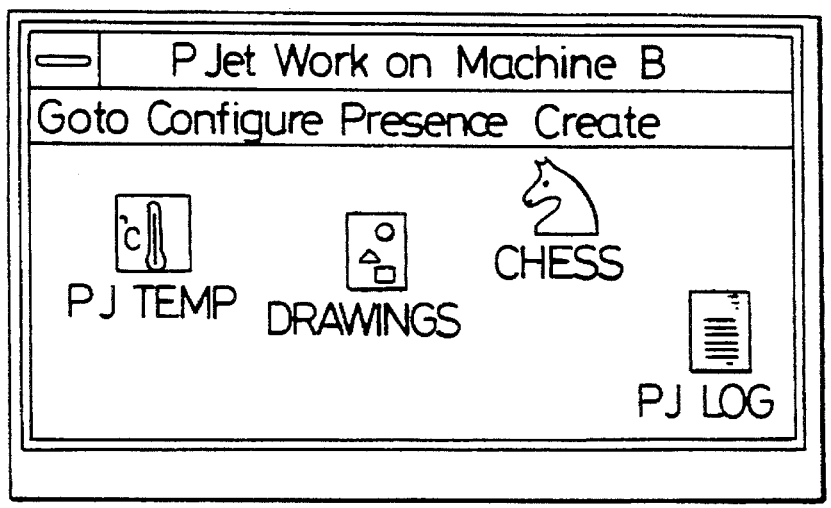

To create a new object, the user selects the Create option from the menu bar 88 which brings up a menu detailing the possible objects which can be created as shown in FIG. 17. This list corresponds to the templates which are stored in the Supplies Cupboard. On selection of one of these (the Chessboard in this case) the cursor changes into the object selected and the user can "deposit" the newly created object "Chess" at will. In this example, the user deposits the Chess Object in the PJet Work Folder as illustrated in FIG. 18.

Figure 19:
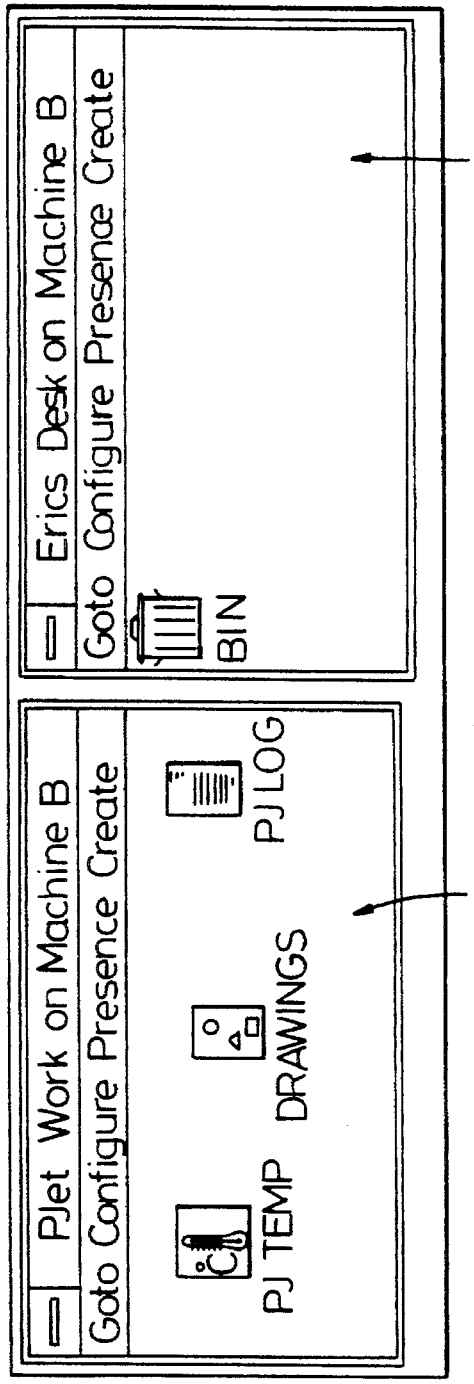
Figure 20:
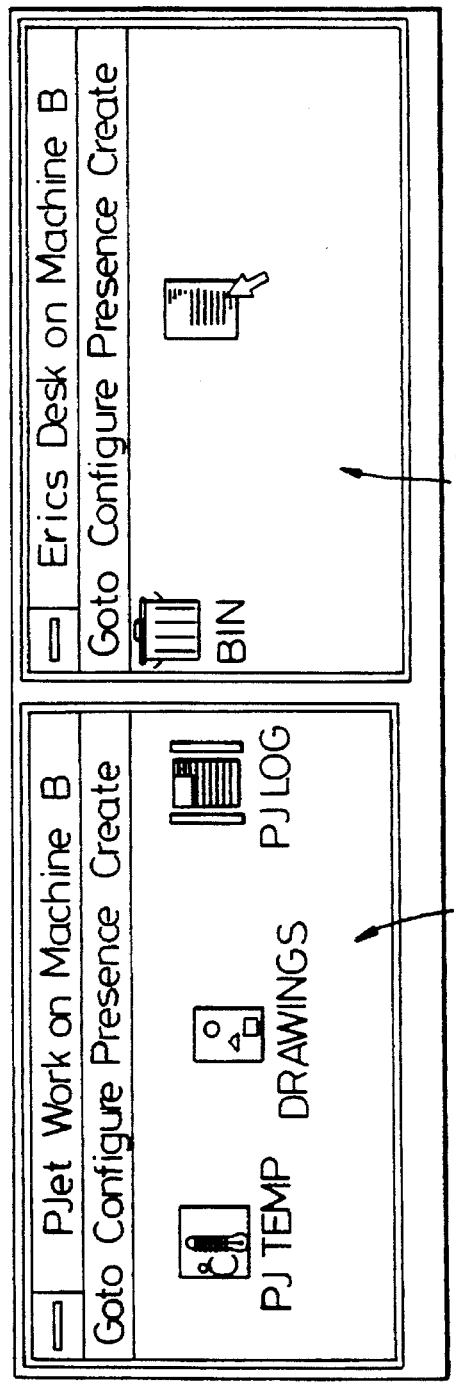
Figure 21:
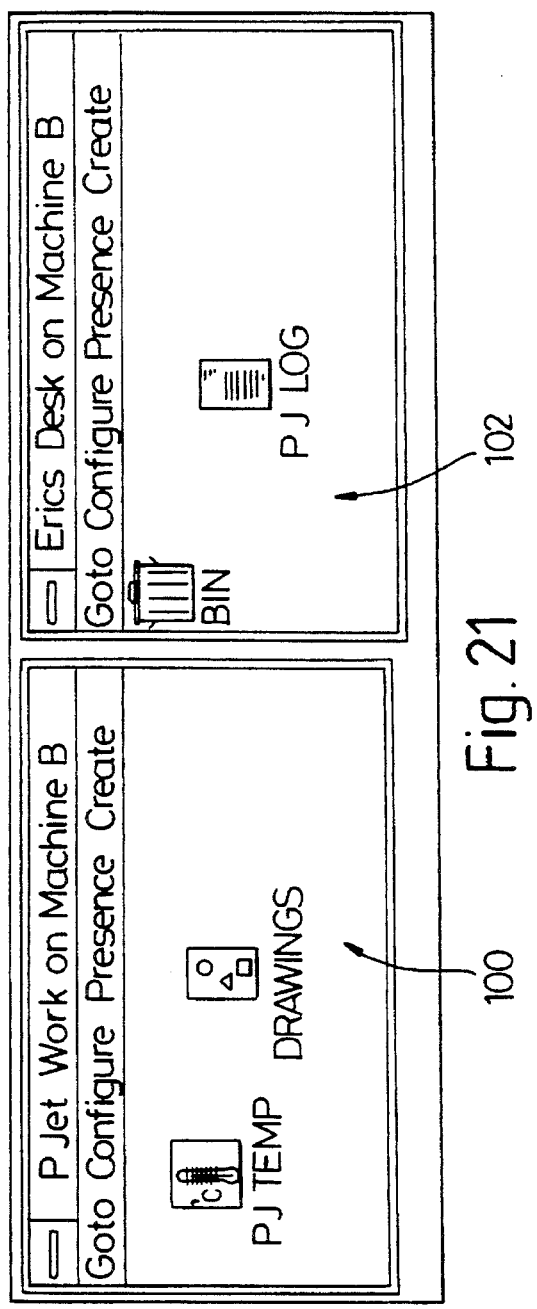

Referring to FIG. 19, the user's screen now has two Task Windows 100 and 102. Task Window 100 is viewing the folder object PJet Work which contains the documents. Drawings and PJ Log and a folder PJ Temp. The Task Window 102 is viewing the Desktop which contains the Bin (and the folder object PJet Work?). If the user wishes to move the document PJ Log from the folder PJ Work into the Desktop, the user selects the document causing its icon to darken as shown in FIG. 20 and "drags" PJ Log from Task Window 100 to Task Window 102 and then releases PJ Log. FIG. 21 shows that PJ Log is now in the Desktop and is no longer contained by PJet Work.

Figure 22:
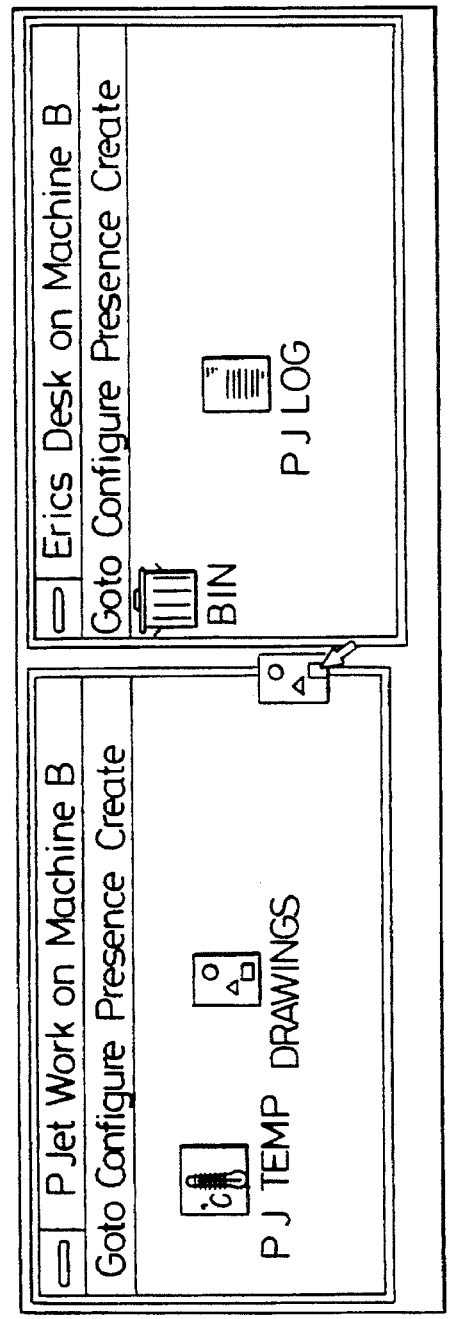
Figure 23:
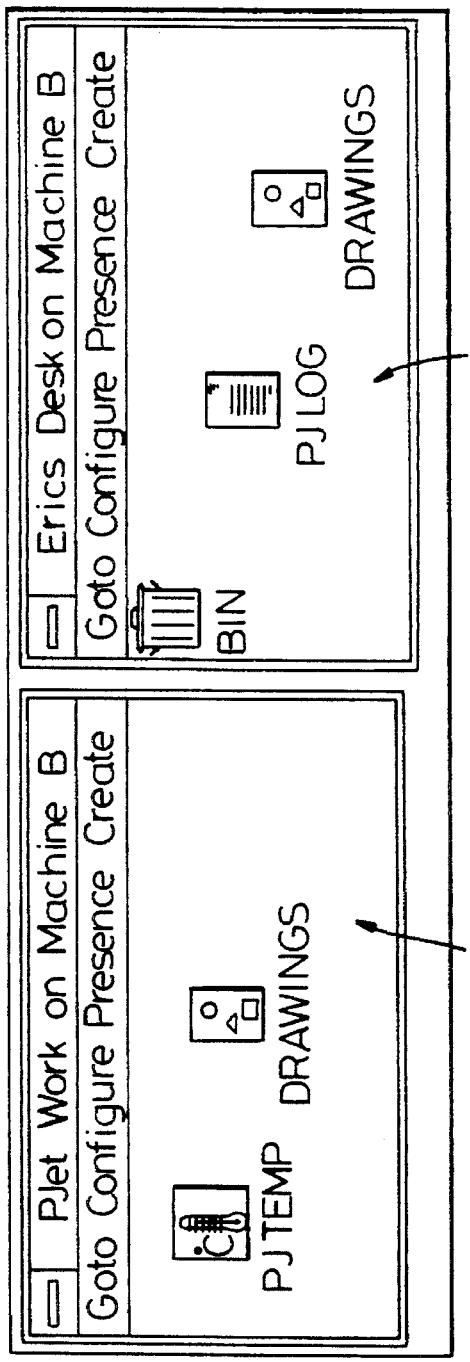

Referring to FIG. 22 if the user wishes to copy the document Drawings into the Desktop, the user again selects the document Drawings, this time for copying, drags it into the Task Window 102 as indicated in FIG. 22 and deposits it in the Task Window 102 as shown in FIG. 23. A copy of the document Drawings then resides in the Desktop and the original document remains in the folder PJet Work.

It is necessary to differentiate a Move operation from a Copy operation and this can be done in several ways. One way is for a Move operation to require the user to click on the object which he/she has decided to move and then to drag the object to the new location. When a mouse input device is being used, clicking implies pressing the mouse button when the cursor is located over the desired object and dragging means then moving the mouse whilst the button is held down. The Copy operation in contrast could require the user to click on the desired object and then to press a designated key, such as the Alt key, and to drag the object to the new location.

Figure 24:
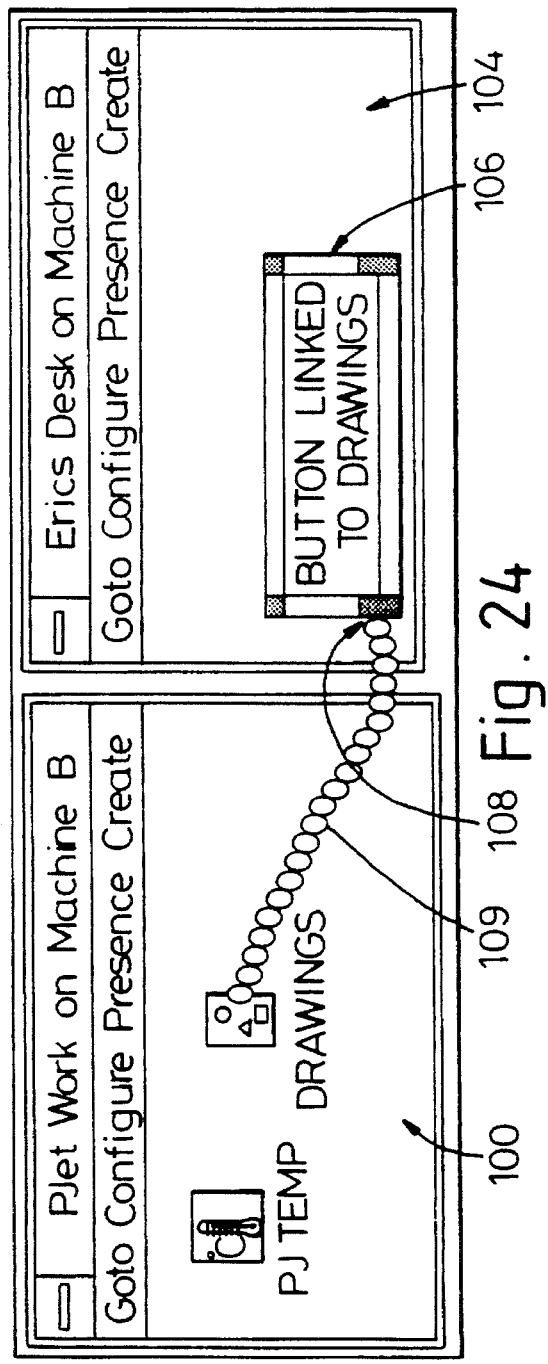
Figure 27:
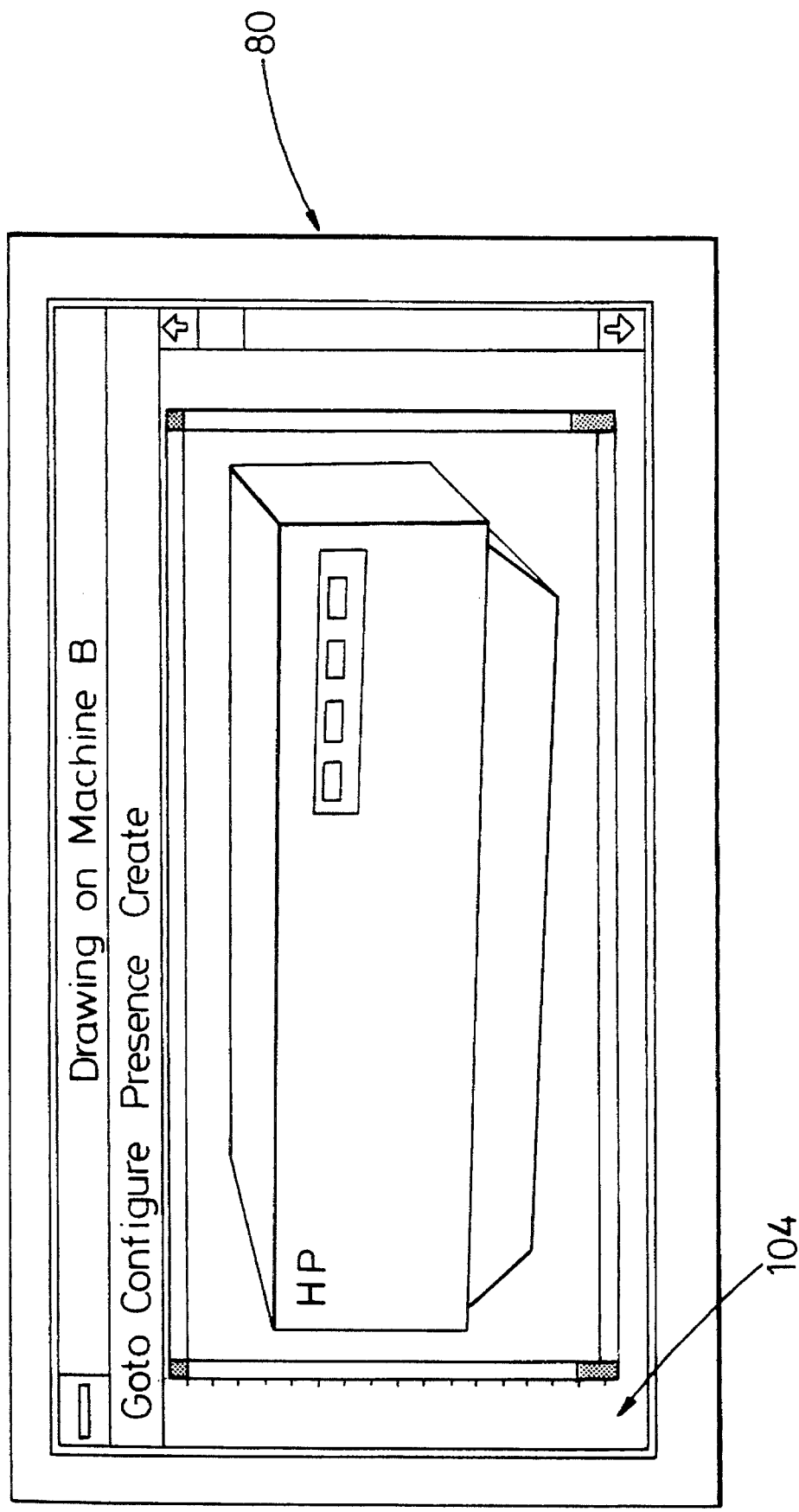

FIG. 24 depicts a screen in which there are two Task Windows, Task Window 100 viewing PJet work and another Task Window 104 viewing a Folder object. The Folder object contains a Button object. FIG. 24 shows that the user has selected the Button object which causes a Secondary Window 106 surrounding the Button object to become visible. The Secondary Window 106 contains several specialized selector regions including a link box 108. By clicking on the link box 108 and dragging to the Drawings document in PJet Work, the user links the Button object to the Drawings document and a "chain" 109 is temporarily visible. The Button is now linked to the Drawings document and can be labelled as such as shown in FIG. 25. Subsequently, selecting the Button will cause the system automatically to traverse to view the document Drawings so that the screen changes from that shown in FIG. 26 to that shown in FIG. 27.

Figure 28:
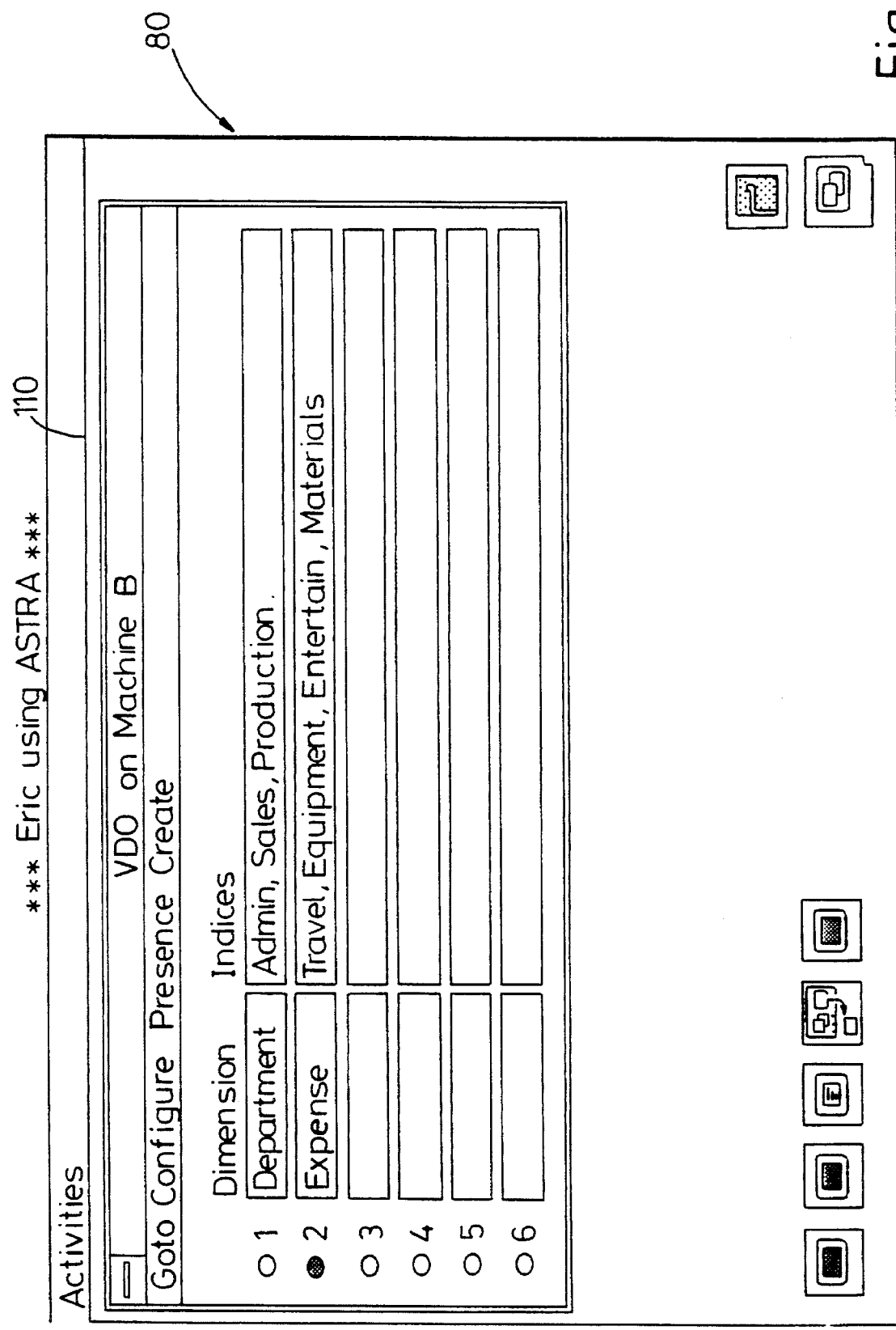
Figure 29:
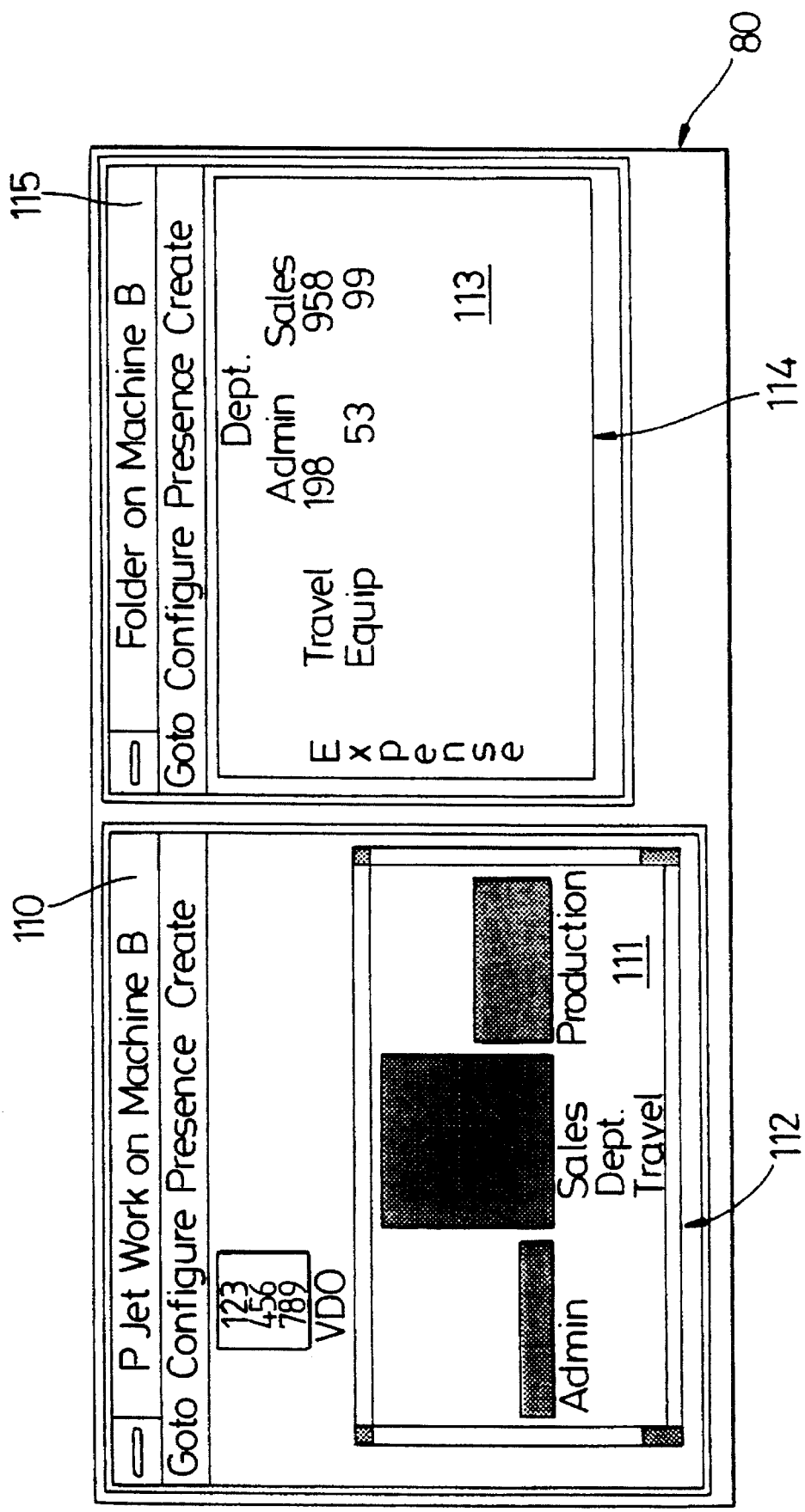
Figure 30:
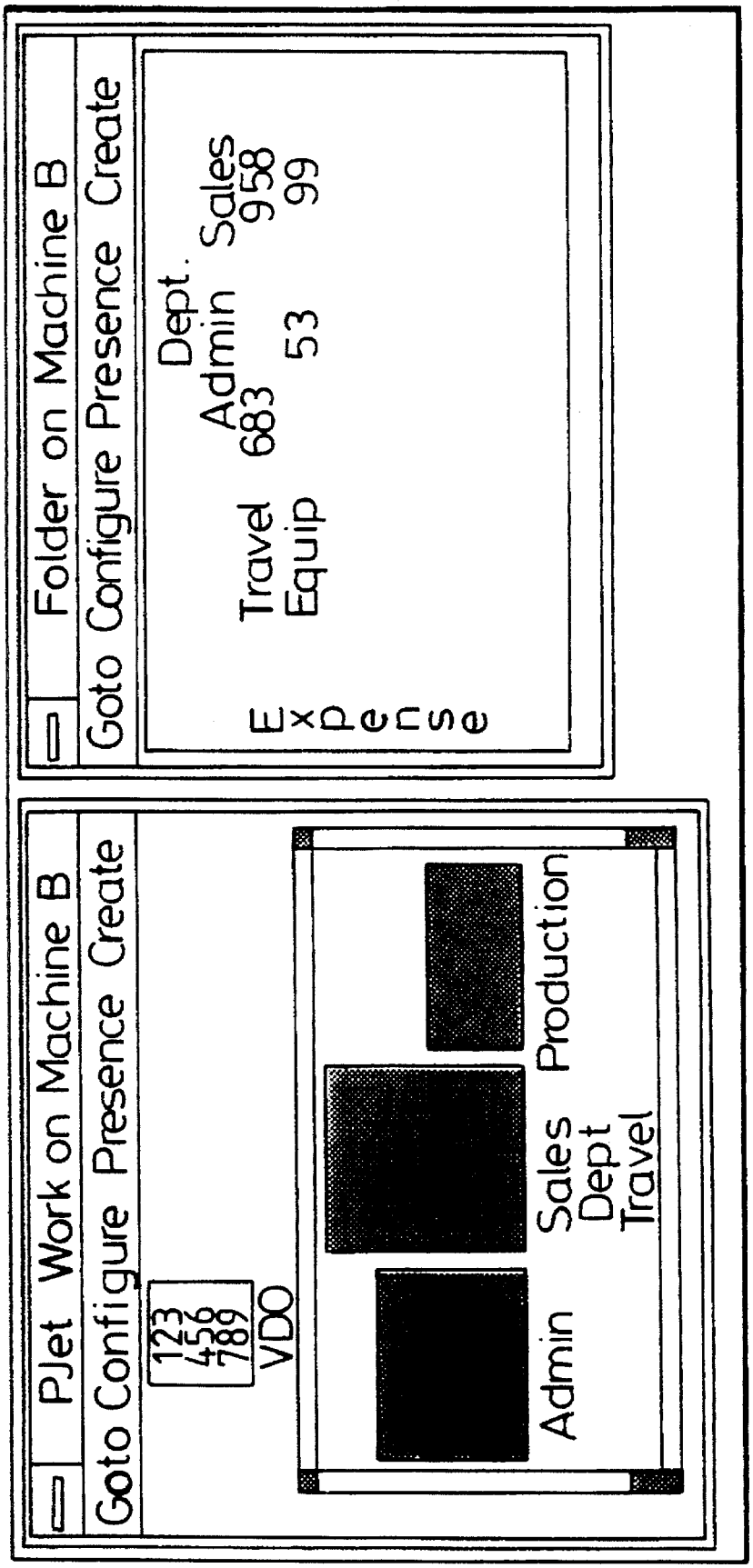

Referring to FIG. 28, the user is viewing a VDO in a Task Window 110 which shows the dimensions and indices of the VDO but not the actual data. FIGS. 29 and 30 each show a Bar Chart secondary object 111 linked to the VDO being viewed in a Secondary Window 112 in the Task Window 110 and a Table secondary object 113 being viewed in a secondary Window 114 in another Task Window 115 which is also linked to the VDO. FIGS. 29 and 30 show how altering an entry in the Table (for Admin Department Travel) causes a corresponding change in the Bar Chart owing to a change in the data held by the VDO.

APPENDIX A

| FROM | TO | MESSAGE |
|---|---|---|
| Create | | |
| Container | Supplies Cupboard Object | Create (Container ID, Subclass) |
| New Object | OM | Get Object ID |
| OM | New Object | Here Object ID |
| New Object | Container | Create Done (New Object ID) |
| Destroy | | |
| Object 1 | Object 2 | Destroy Yourself |
| linked object | Object 1 | Hi to Lo Unlink (Object 1 ID) |
| or | | |
| linked object | Object 1 | Lo to Hi Unlink (Object 1 ID) |
| Object 1 | Contained Object | Destroy Yourself |
| Contained Object | Object 1 | Destroy Done |
| Object 1 | OM | Deregister Request |
| OM | Object 1 | Deregister |
| Object 1 | Object 2 | Destroy Done |
| Register | | |
| Container | OM | Register Object (object ID, Class) |
| Deregister | | |
| Object | OM | Deregister Request |
| OM | Object | Deregistered |
| Activate | | |
| Task | OM | Get My Object ID |
| Task | OM | Activate (Object ID, h Task) |
| Deactivate | | |
| Object | OM | Deactivate Request |
| OM | Object | QUIT |
| Object | OM | Deactivate Acknowledge |
| Move | | |
| SW | TW | Get Move Info |
| TW | SW | Here Move Info (ID, target position) |
| SW | S | Move object (M ID, T ID, Target Position) |
| If S = T: | | |
| S | Viewers of S | Move Local (M ID, new position) |
| If S ≠ T: | | |
| S | OM | Move Copy Lock |
| (S | SW | Can't Move) |
| S | M | Move Yourself |
| (M | S | Won't Move) |
| M | S | Remove Object (M ID) |
| S | Viewers of S | Remove Object (M ID) |
| If M on same M/C as T: | | |
| M | T | Insert Local |
| T | Viewers of T | Insert |
| M | Viewers of M | New Parent |
| M | S | Move Complete |
| S | OM | Release Move Copy Lock |
| If T not on same M/C as M: | | |
| (old) M | OM | Deregister Request |
| (old) M | OM | Get object ID |
| (old) M | T | Insert (M) |

APPENDIX A-continued

| FROM | TO | MESSAGE |
|---|---|---|
| T | Viewers of T | Insert (New M) |
| (old) M | New M | New Node Prompt |
| (old) M | New M viewers | New Parent (T ID) |
| M childless: | | |
| (old) M | S | Move Complete |
| M has children | | |
| (old) M | C | Send Yourself |
| C on same M/C as New M | | |
| C of M | Old M | Move Complete |
| C | New M | Register Me [C] |
| C has children | | |
| Old C | Child Object of C | Send Yourself |
| Child Object of C | Old C | Move Complete |
| Old C | Old M | Move Complete |
| Old M | S | Move Complete |
| S | OM | Release Move Copy Lock |
| Link | | |
| SW | S | Link (Target Object) |
| If S already linked: | | |
| S | O | Unlink |
| S | P | Link |
| (S | VDO | Get VDO Info |
| VDO | S | Here VDO Info) |
| Unlink | | |
| SW | S | Unlink |
| S | P | Unlink |
| (P | S | Unlink) |
| Copy | | |
| SW | TW | Get Copy Info |
| TW | SW | Here Copy Info (T ID, position in T) |
| SW | S | Copy Object (C ID, T ID, insert position) |
| S | OM | Move Copy Lock |
| (S | SW | Can't Copy) |
| S | C | Copy Yourself |
| (C | S | Won't Copy) |
| (S | SW | Won't Copy) |
| C | T | Insert ($C^1$) |
| C = secondary object | | |
| C | $C^1$ | Link Yourself (Primary Object ID) |
| T | T's viewers | Insert |
| C has no children: | | |
| S | C | Copy Complete |
| S | OM | Release Move Copy Lock |
| C has children: | | |
| C | Child of C | Copy Yourself |
| Child of C | C | Copy Complete |

What is claimed:

1. A distributed object based computer system, comprising:

first and second storage domains;

a first host computer operatively coupled to said first storage domain and a second host computer operatively coupled to said second storage domain;

first and second input devices operatively coupled, respectively, to said first and second host computers, said input devices adapted for receiving input signals from users of said first and second computers;

first and second graphic display devices operatively coupled to said first and second host computers, respectively, for displaying representations of objects, said input devices and graphic display devices permitting manipulation of objects by said users;

a plurality of objects, said plurality of objects including first and second primary objects ($P_1$, $P_2$), first and second secondary objects ($S_1$, $S_2$), first and second window objects ($P_{1W}$, $P_{2W}$) for viewing said first and second primary objects, respectively, and third and fourth window objects ($S_{1W}$, $S_{2W}$) for viewing said first and second secondary objects, respectively, wherein each of said objects has its own data and associated processes and wherein said objects are discrete entities that may be individually movable, copyable, viewable and destroyable in response to signals from said input devices, and wherein said objects $P_1$, $S_1$, $P_{1W}$, and $S_{1W}$ reside in said first storage domain and said objects $P_2$, $S_2$, $P_{2W}$, and $S_{2W}$ reside in said second storage domain; and linking means for sustaining the following object-object links:

a containership link between said first primary object ($P_1$) and said first secondary object ($S_1$), and a primary-secondary weak link between said first primary object and said second secondary object ($P_1$-$S_2$), wherein each object $P_1$,$S_2$ in said weak link may exhibit different representations and wherein said weak link ($P_1$-$S_2$) indicates that, if either one of $P_1$ or $S_2$ is moved, copied, viewed or destroyed in response to a signal from an input device, the effect on all objects weakly linked to the moved, copied, viewed or destroyed object will be in accordance with a predetermined set of rules wherein if $P_1$ or $S_2$ is moved, $P_1$ will remain weakly linked to $S_2$;

if $P_1$ is destroyed, $S_2$ will be unlinked; and if $S_2$ is destroyed, $P_1$ will be unlinked.

2. A distributed object based computer system as recited in claim 1, wherein said containership link indicates that $P_1$ and $S_1$ are in a common storage domain and that $S_1$ will be destroyed if $P_1$ is destroyed.

3. A distributed object based computer system as recited in claim 1, further comprising an inactive object and activation means for automatically activating said inactive object in response to said inactive object being sent a message, wherein said inactive object comprises and is fully defined by a file stored in a storage medium.

4. A distributed object based computer system as recited in claim 1, wherein said predetermined set of rules further comprises a rule wherein if $P_1$ is copied, the copy of $P_1$ will not automatically be linked to $S_2$;

if $S_2$ is copied, $P_1$ will be automatically weakly linked to both $S_2$.

5. A distributed object based computer system as recited in claim 1, further comprising selecting means for selecting said second secondary object $S_2$ in response to a select signal from an input device, and means for automatically displaying said first primary object $P_1$ in response to said select signal if $P_1$ is weakly linked to $S_2$.

6. A distributed object based computer system as recited in claim 22, further comprising distributed storage means for storing a first link record for $P_1$, a second link record for $S_1$, a third link record for $P_2$, and a fourth link record for $S_2$, wherein said first link record indicates the identity of all objects to which P₁ is linked and the nature of the link(s), said second link record indicates the identity of all objects to which S₁ is linked and the nature of the link(s), said third link record indicates the identity of all objects to which P₂ is linked and the nature of the link(s), and said fourth link record indicates the identity of all objects to which S₂ is linked and the nature of the link(s).

7. A distributed object based computer system as recited in claim 6, wherein each of said link records is stored in the same storage domain as its corresponding object.

8. A distributed object based computer system as recited in claim 1, wherein said linking means includes means for linking only a part of an object to another object.

9. A distributed object based computer system as recited in claim 1, wherein said containership link indicates that $P_1$ and $S_1$ are in a common storage domain and that $S_1$ will be destroyed if $P_1$ is destroyed;

further comprising an inactive object and activation means for automatically activating said inactive object in response to said inactive object being sent a message, wherein said inactive object comprises and is fully defined by a file stored in a storage medium; and wherein the following set of rules is associated with said primary-secondary weak link ($P_1$-$S_2$):

if $P_1$ or $S_2$ is moved, $P_1$ will remain weakly linked to $S_2$;

if $P_1$ is copied, the copy of $P_1$ will not automatically be linked to $S_2$;

if $S_2$ is copied, $P_1$ will be automatically weakly linked to both $S_2$ and the copy of $S_2$;

if $P_1$ is destroyed, $S_2$ will be unlinked; and if $S_2$ is destroyed, $P_1$ will be unlinked;

further comprising selecting means for selecting said second secondary object $S_2$ in response to a select signal from an input device, and means for automatically displaying said first primary object $P_1$ in response to said select signal if $P_1$ is weakly linked to $S_2$.

10. A distributed object based computer system as recited in claim 9, further comprising distributed storage means for storing a first link record for $P_1$, a second link record for $S_1$, a third link record for $P_2$, and a fourth link record for $S_2$, wherein said first link record indicates the identity of all objects to which $P_1$ is linked and the nature of the link(s), said second link record indicates the identity of all objects to which $S_1$ is linked and the nature of the link(s), said third link record indicates the identity of all objects to which $P_2$ is linked and the nature of the link(s), and said fourth link record indicates the identity of all objects to which $S_2$ is linked and the nature of the link(s); wherein each of said link records is stored in the same storage domain as its corresponding object.

11. A distributed object based computer system as recited in claim 1, wherein said containership link indicates that $P_1$ and $S_1$ are in a common storage domain and that $S_1$ will be destroyed if $P_1$ is destroyed;

further comprising an inactive object and activation means for automatically activating said inactive object in response to said inactive object being sent a message, wherein said inactive object comprises and is fully defined by a file stored in a storage medium; and selecting means for selecting said second secondary object $S_2$ in response to a select signal from an input device, and means for automatically displaying said first primary object $P_1$ in response to said select signal if $P_1$ is weakly linked to $S_2$.

12. A distributed object based computer system as recited in claim 11, further comprising distributed storage means for storing a first link record for $P_1$, a second link record for $S_1$, a third link record for $P_2$, and a fourth link record for $S_2$, wherein said first link record indicates the identity of all objects to which $P_1$ is linked and the nature of the link(s), said second link record indicates the identity of all objects to which $S_1$ is linked and the nature of the link(s), said third link record indicates the identity of all objects to which $P_2$ is linked and the nature of the link(s), and said fourth link record indicates the identity of all objects to which $S_2$ is linked and the nature of the link(s); wherein each of said link records is stored in the same storage domain as its corresponding object.

13. A distributed object based computer system, comprising:

first and second storage domains;

a first host computer operatively coupled to said first storage domain and a second host computer operatively coupled to said second storage domain;

first and second input devices operatively coupled, respectively, to said first and second host computers, said input devices adapted for receiving input signals from users of said first and second computers;

first and second graphic display devices operatively coupled to said first and second host computers, respectively, for displaying representations of objects, said input devices and graphic display devices permitting manipulation of objects by said users;

a plurality of objects, said plurality of objects including first and second primary objects ($P_1$, $P_2$), first and second secondary objects ($S_1$, $S_2$), first and second window objects ($P_{1W}$, $P_{2W}$) for viewing said first and second primary objects, respectively, and third and fourth window objects ($S_{1W}$, $S_{2W}$) for viewing said first and second secondary objects, respectively, wherein each of said objects has its own data and associated processes and wherein said objects are discrete entities that may be individually movable, copyable, viewable and destroyable in response to signals from said input devices, and wherein said objects $P_1$, $S_1$, $P_{1W}$, and $S_{1W}$ reside in said first storage domain and said objects $P_2$, $S_2$, $P_{2W}$, and $S_{2W}$ reside in said second storage domain; and linking means for sustaining the following object-object links:

a containership link between said first primary object ($P_1$) and said first secondary object ($S_1$), and a primary-secondary weak link between said first primary object and said second secondary object ($P_1$-$S_2$), wherein said weak link ($P_1$-$S_2$) indicates that, if either one of $P_1$ or $S_2$ is moved, copied, viewed or destroyed in response to a signal from an input device, the effect on all objects weakly linked to the moved, copied, viewed or destroyed object will be in accordance with a set of rules, wherein if $P_1$ or $S_2$ is moved, $P_1$ will remain weakly linked to $S_2$;

if $P_1$ is copied, the copy of $P_1$ will not automatically be linked to $S_2$;

if $S_2$ is copied, $P_1$ will be automatically weakly linked to both $S_2$ and the copy of $S_2$;

if $P_1$ is destroyed, $S_2$ will be unlinked; and if $S_2$ is destroyed, $P_1$ will be unlinked.

14. A distributed object based computer system as recited in claim 13, wherein said containership link indicates that $P_1$ and $S_1$ are in a common storage domain and that $S_1$ will be destroyed if $P_1$ is destroyed.

15. A distributed object based computer system as recited in claim 13, further comprising an inactive object and activation means for automatically activating said inactive object in response to said inactive object being sent a message, wherein said inactive object comprises and is fully defined by a file stored in a storage medium.

16. A distributed object based computer system as recited in claim 13, further comprising selecting means for selecting said second secondary object $S_2$ in response to a select signal from an input device, and means for automatically displaying said first primary object $P_1$ in response to said select signal if $P_1$ is weakly linked to $S_2$.

17. A distributed object based computer system as recited in claim 13, further comprising distributed storage means for storing a first link record for $P_1$, a second link record for $S_1$, a third link record for $P_2$, and a fourth link record for $S_2$, wherein said first link record indicates the identity of all objects to which $P_1$ is linked and the nature of the link(s), said second link record indicates the identity of all objects to which $S_1$ is linked and the nature of the link(s), said third link record indicates the identity of all objects to which $P_2$ is linked and the nature of the link(s), and said fourth link record indicates the identity of all objects to which $S_2$ is linked and the nature of the link(s).

18. A distributed object based computer system as recited in claim 17, wherein each of said link records is stored in the same storage domain as its corresponding object.

19. A distributed object based computer system as recited in claim 13, wherein said linking means includes means for linking only a part of an object to another object.

* * * * *